(12) United States Patent
Hofmann

(10) Patent No.: US 10,059,517 B2
(45) Date of Patent: Aug. 28, 2018

(54) STORAGE AND ORDER-PICKING SYSTEM AND METHOD FOR PROVIDING ARTICLES IN A PARTICULAR ORDER

(71) Applicant: SSI Schaefer Noell GmbH Lager- und Systemtechnik, Giebelstadt (DE)

(72) Inventor: Christian Hofmann, Wurzburg (DE)

(73) Assignee: SSI Schäfer Noell GmbH Lager- und Systemtechnik, Giebelstadt (DE)

( * ) Notice: Subject to any disclaimer, the term of this patent is extended or adjusted under 35 U.S.C. 154(b) by 0 days.

(21) Appl. No.: 15/429,707

(22) Filed: Feb. 10, 2017

(65) Prior Publication Data

US 2017/0152106 A1     Jun. 1, 2017

Related U.S. Application Data

(63) Continuation of application No. PCT/EP2015/068390, filed on Aug. 10, 2015.

(30) Foreign Application Priority Data

Aug. 11, 2014  (DE) .......................... 10 2014 111 385
Aug. 11, 2014  (DE) .......................... 10 2014 111 396
Aug. 10, 2015  (WO) ................. PCT/EP2015/068390

(51) Int. Cl.
```
B65G 1/00       (2006.01)
B65G 1/04       (2006.01)
B65G 1/137      (2006.01)
```

(52) U.S. Cl.
CPC ......... B65G 1/0492 (2013.01); B65G 1/1378 (2013.01)

(58) Field of Classification Search
CPC .. B65G 1/0492; B65G 1/1373; B65G 1/1378; B65G 1/065
See application file for complete search history.

(56) References Cited

U.S. PATENT DOCUMENTS

| 4,508,484 A | 4/1985 | Heiz |
| 4,901,842 A | 2/1990 | Lemboke et al. |

(Continued)

FOREIGN PATENT DOCUMENTS

| DE | 37 18 206 A1 | 12/1988 |
| DE | 102008039764 | 5/2010 |

(Continued)

OTHER PUBLICATIONS

Günter Ullrich: "Fahrerlose Transportsysteme"; partial translation of book, 2011, pp. 80-83 and 95-97.

(Continued)

*Primary Examiner* — William R Harp
(74) *Attorney, Agent, or Firm* — Renner, Otto, Boisselle & Sklar, LLP

(57) ABSTRACT

A storage and order-picking system and method characterized by a shelf arrangement having shelves, vertical conveyors, and autonomously movable, driverless transport vehicles (FTF) with an FTF plane which is substantially barrier-free and which extends under, over or through the shelf arrangement. The FTF plane is coupled to the shelf arrangement by conveyor technology via the vertical conveyors. The FTF plane has a travel surface with a topology of travel points and segments along which the FTFs move in a guided manner, the segments each extending from one travel point to another adjacent travel point. A fleet manager produces and outputs travel orders for the FTFs, the orders comprising individual navigation information, in order to transport the storage goods, which are not yet transported to the FTF plane by the vertical conveyors in an absolute order, along individual travel paths specifically produced for the FTF away from/to the vertical conveyors.

15 Claims, 14 Drawing Sheets

(56) References Cited

U.S. PATENT DOCUMENTS

| | | | |
|---|---|---|---|
| 6,997,666 B1 | 2/2006 | Rodgers et al. | |
| 7,261,509 B2 | 8/2007 | Freudelsperger | |
| 7,920,962 B2* | 4/2011 | D'Andrea | G05B 19/41895 |
| | | | 700/245 |
| 8,412,400 B2 | 4/2013 | D'Andrea et al. | |
| 8,827,619 B2* | 9/2014 | Schafer | B65G 1/1378 |
| | | | 414/268 |
| 8,919,535 B2 | 12/2014 | Tiebel et al. | |
| 8,974,168 B2 | 3/2015 | Yamashita | |
| 8,989,918 B2 | 3/2015 | Sturm | |
| 9,725,238 B2* | 8/2017 | Mathys | B65G 1/0407 |
| 2010/0300048 A1 | 12/2010 | Krizmanic et al. | |
| 2013/0251480 A1 | 9/2013 | Watt et al. | |
| 2017/0203921 A1* | 7/2017 | Issing | B65G 1/0492 |

FOREIGN PATENT DOCUMENTS

| | | |
|---|---|---|
| DE | 10136354 | 6/2010 |
| DE | 102011089858 | 6/2013 |
| DE | 102015001540 | 8/2015 |
| EP | 2 044 494 | 4/2009 |
| EP | 2 543 611 | 1/2013 |
| EP | 2 573 013 | 3/2013 |
| EP | 2 607 292 | 6/2013 |
| EP | 2 786 946 | 10/2014 |
| JP | H11116006 | 4/1999 |
| JP | 2003285906 | 10/2003 |
| JP | 2011102166 | 5/2011 |
| WO | WO 2007/134840 | 11/2007 |
| WO | WO 2007/149711 A2 | 12/2007 |
| WO | WO 2009/143335 A2 | 11/2009 |
| WO | WO 2011/089063 A1 | 7/2011 |
| WO | WO 2014/161709 | 10/2014 |

OTHER PUBLICATIONS

International Preliminary Report on Patentability for corresponding Patent Application No. PCT/EP2015/068390 dated Feb. 16, 2017.

* cited by examiner

STORAGE AND ORDER-PICKING SYSTEM AND METHOD FOR PROVIDING ARTICLES IN A PARTICULAR ORDER

RELATED APPLICATIONS

This is a continuation application of the co-pending international patent application PCT/EP2015/068390 (WO 2016/023869 A2) filed on Aug. 10, 2015, which claims priority of the German patent applications DE 10 2014 111 385.3 (filed on Aug. 11, 2014) and DE 10 2014 111 396.9 (filed on Aug. 11, 2014). Each of the above-mentioned applications is fully incorporated herein by reference.

BACKGROUND OF THE INVENTION

The present invention relates to a storage and order-picking system. Further, the present invention relates to a method of storing and retrieving articles in a sequenced manner into and from a rack arrangement for providing the articles in a sequenced manner, for example, in an ascending order, and in an order-orientated manner, for example, at a target location (e.g., picking-work station). For this purpose in particular a driverless, or operatorless, transport system (FTS) having autonomous driverless transport vehicles (FTF) is used. Classic pre-zone, which is characterized by steady conveyors, is replaced by an FTF plane. Particularly, the invention is used in "case-picking" scenarios.

The present invention further relates a system for loading and unloading a piece good, or an article, on and from an FTF.

RELATED PRIOR ART With both "case picking" and "piece picking" storage containers are transported in an order-orientated manner from a warehouse towards a picking-work station for the purpose of article removal and delivery. The warehouse comprises racks in which the articles can be stored with or without load supports. The storage and retrieval of the articles is performed by means of storage and retrieval devices, load-handling devices (LHD) of which are typically moveable horizontally and, if necessary, vertically in rack aisles being defined between the racks. The storage and retrieval devices are supplied with the articles via vertical conveyors, or elevators, which in turn are arranged at a front face of the racks and rack aisles. A corresponding arrangement is exemplarily disclosed in the document U.S. Pat. No. 7,261,509 B. The elevators convey the articles vertically to a conveying system plane being arranged adjacent again at a front face, or front end, of the racks and rack aisles. This conveying-line plane is also designated as a "pre-zone".

Typically, the pre-zone comprises a plurality of conveying-line branches which are used as buffering lines for connecting the respective rack aisles in a conveying manner to a sorting circle which brings the retrieved articles into a desired order, i.e. the articles are delivered in the desired order to one or more target locations (e.g., picking-work station). The document US 2010/300048 A1 discloses a pre-zone having buffering lines between a centrally arranged sorting circle and elevators being arranged at a front face. Since the buffering lines and the sorting circle respectively comprise an unchangeable course of lines and since the sorting circle has a limited receiving capacity it is required that the storage and retrieval devices and the elevators, which represent two separate sequencing stages, sequence the articles in advance. This means that the storage and retrieval devices retrieve the articles in a predetermined order (first sequencing stage) which corresponds roughly, but not exactly, to the desired order. If several storage and retrieval devices are operated on top of each other a (rack) plane, from which the elevators retrieve the articles being delivered by the storage and retrieval devices in order to transport the articles vertically towards the pre-zone, represents a further second sequencing stage. In a third sequencing stage (sorting circle) the final sequencing is performed in terms of delivery to the target location(s). In this case planning and controlling efforts are significant for bringing the articles in the desired order to the work station (target location). The planning needs to be performed in advance in three stages and already starts with the selection of one of the storage and retrieval devices. Then the storage and retrieval devices need to cover, due to the sequence, very long ways, or paths, within the rack aisles for retrieving an article preset by the (pre-) sequence and for bringing same to the elevator arranged at the front face.

Another problem is to be seen in the space available to the system. The pre-zone is arranged, as a rule, in front of the warehouse at the front face. Typically the pre-zone is relatively small (compared to the warehouse). The steady conveyors (such as roller lines, belt conveyors, strap conveyors, chain conveyors, etc.), which are used in the pre-zone, have a fixed course of lines which cannot be changed simply. After start-up of the system the course of lines, particularly within the pre-zone, is actually preset in a fixed manner and unchangeable. The conveying components of the pre-zone often are difficult to access just because of the spare space for maintenance operations. In FIG. 1 of the document DE 101 36 354 A1 it is disclosed a relatively complex course of lines of the conveying system within the pre-zone for supplying two work stations with storage containers via two separate conveying circles. As a rule, the pre-zone is crossed by an additional conveying line dedicated to order containers so that even less space is available.

A "steady conveyor" is to be understood as conveyor which transports the conveying goods (bulk material or piece goods) in a steady flow from one or more deposition locations (sources) to one or more delivery locations (targets). Examples of steady conveyors are: belt conveyors, roller conveyors, chain conveyors, and circle conveyors. Typical features of steady conveyors are: continuous/discrete-continuous conveying-good stream, central drive in continuous operation, loading and unloading in operation, always ready for receiving/delivering, and stationary devices. The continuous operation allows transport of relatively huge amounts in short time (compared to non-steady conveyors).

A front-face transfer of the articles from and into the racks via the elevators, which are arranged at the front face, represents a bottle neck of performance. Performance is to be understood in the following as a number of storage/retrieval processes per unit of time, or a number of picks per unit of time. In the document WO 2007/134840 A, which has been filed on behalf of the applicant, it is disclosed a warehouse layout which deviates from the arrangement of the elevators at the front face. WO 2007/134840 A proposes to respectively position a plurality of elevators laterally to the longitudinal sides of the racks for increasing—compared to elevators arranged at the front face—the performance. However, this plurality of elevators is in turn coupled to conventional steady conveyors which bring the retrieved articles to (picking) work stations which are located, as a rule, far away. Due to the utilization of steady conveyors in the pre-zone WO 2007/134840 A still requires pre-sequencing by means of the storage and retrieval devices within the warehouse, or within the racks. Additionally, the steady conveyors require relatively much space and thus make, amongst other things, a spatial compaction of the warehouse layout difficult.

A different conceptual approach is described in the document EP 2 044 494 A1. There, autonomous vehicles (shuttles) are disclosed which move smallest racks within an action area from a storage region into a picking region. This means that to-be-picked articles are not retrieved from the racks and are not transported to the work stations by means of the vehicles, but that the vehicles transport the racks directly to the work stations. However, even in this case planning efforts are significant. The sequencing is complicated because entire racks need to be moved in the right order (and orientation) to the work station.

The document DE 10 2008 039 764 A1 discloses driverless transport vehicles having comb-prong-like deposition webs, which are attached to a top side and on which goods are transported. This comb-prong-like webs mesh with horizontally arranged rollers of a roller track, which rollers are distanced to each other and mesh the goods from the webs or deliver the goods to the webs. The goods are fed and discharged perpendicularly to a travelling direction of the transport vehicle. The vehicle can drive continuously through the rollers of the roller track during transfer. However, in any case stoppers are required for holding the goods during the transfer. For unloading the vehicle a static stopper is sufficient. For loading the vehicle moveable stoppers are required.

During unloading of the vehicles relatively much time is required since the delivered goods need to be discharged first laterally via the roller track before a subsequent vehicle can deliver its goods to the roller track. Loading process is similar. A subsequent vehicle can only be loaded if the vehicle, which drives ahead, has received its good completely. This means that during both unloading and loading distances need to be maintained, or are generated gaps between subsequent goods or vehicles. Thus, the loading and unloading cannot happen in terms of a continuous stream where the goods follow each, or flow, directly without distances.

During loading of the vehicles the stopper needs to be moved since the stopper first needs to hold the to-be-delivered good and then release same. For the movement of the stopper mechanical links, or controlled actuators, are required. Actuators need to be controlled so that a corresponding controlling device is required.

SUMMARY OF THE INVENTION

Therefore, it is an object of the present invention to a provide a storage and order-picking system as well as a method with increased performance and enhanced sequencing possibilities, in particular in the region of the (classic) pre-zone. Further, it is desirable to reduce a sequencing effort, or to allow more freedom in selected regions such as within the racks, with regard to optimizations. Preferably, the storage and retrieval devices are to be operated in a path-optimized manner without the need to consider sequencing.

Therefore, it is another object of the present invention to provide a system for loading and unloading a piece good on and from an FTF overcoming the above-mentioned drawbacks.

According to a first aspect of the invention it is disclosed a storage and order-picking system comprising: a rack arrangement which includes a plurality of racks and a plurality of vertical conveyors, wherein the racks respectively comprise a plurality of rack locations being arranged on top of each other and next to each other and into which storage goods can be stored and retrieved, wherein the racks define at least one rack aisle between each other, wherein respectively several ones of the vertical conveyors either are laterally adjacent to longitudinal sides of the racks or arranged within the racks, and wherein the vertical conveyors transport the storage goods substantially vertically; a plurality of storage and retrieval devices which can travel in the rack aisles, preferably in a rail-guided manner, wherein the storage and retrieval devices retrieve the storage goods chaotically and transport same along the rack aisles between the rack locations and transfer locations being arranged within the racks as buffer locations oppositely to the vertical conveyors; at least one fleet of autonomously moveable driverless transport vehicles, FTF; an FTF plane which is substantially provided free of barriers, in particular free of rack locations, and which extends beneath, above, or through the rack arrangement, wherein the FTF plane is coupled, in a conveying manner, via the vertical conveyors, which reach vertically right to the FTF plane, to the rack arrangement, wherein the FTF plane comprises a travelling area including a topology of way points and segments along which the FTF move in a guided manner, wherein each of the segments extends from one of the way points to another adjacent way point; at least one work station which is connected, in terms of material flow, via the FTF to the vertical conveyors; a fleet manager having access to the topology and being configured to generate and output FTF-dedicated individual travelling orders, which include navigation information, in order to transport the storage goods, which have not yet been transported by the vertical conveyors in an absolute order into the FTF plane, along individual travelling paths, which are generated in an FTF-specific manner, from the vertical conveyors to the at least one work station, and to hand over same in the absolute order to the at least one work station.

According to a second aspect of the invention it is disclosed a storage and order-picking system comprising: a statically arranged rack arrangement, which comprises a plurality of racks and a plurality of statically arranged vertical conveyors, wherein the racks respectively include a plurality of rack locations, which are arranged on top of each other and next to each other and in and from which rack locations storage goods are storable and retrievable, and transfer locations, which are arranged as buffer locations oppositely to the vertical conveyors in the racks, wherein the racks define at least one rack aisle between each other, wherein respectively several ones of the vertical conveyors are arranged either laterally adjacent to longitudinal sides of the racks or within the racks for linking the rack aisles in terms of material flow, and wherein the vertical conveyors are configured to transport the storage goods substantially vertically; a plurality of storage and retrieval devices which travel in the rack aisles, wherein the storage and retrieval devices chaotically retrieve the storage goods and transport the storage goods substantially horizontally along the rack aisles between the rack locations and the transfer locations; at least one fleet of autonomously moveable driverless transport vehicles, FTF; an FTF plane which is substantially free of barriers and which extends beneath, above, or through the rack arrangement, wherein the FTF plane is coupled, in a conveying manner, via the vertical conveyors, which reach vertically right to the FTF plane, to the rack arrangement, wherein the FTF plane comprises a travelling area including a topology of way points and segments along which the FTF move in a guided manner, wherein each of the segments extends from one of the way points to another adjacent one of the way points; at least one target location, which is connected, in terms of material flow, to the vertical conveyors via the FTF; a fleet manager having access to the topology and being configured for generating and outputting FTF-dedicated individual travelling orders, which respectively include navigation information and an FTF-specific individual travelling path, for transporting the storage goods, which are not yet transported by the vertical conveyors in an absolute order into the FTF plane, along the FTF-specifically generated individual travelling paths from the vertical conveyors to the at least one target location and for handing-over the storage goods in the absolute order to the at least one target location, or vice versa.

The substitution of the steady conveyors, which are used classically in the pre-zone, by a fleet of autonomous FTF as well as the shift and expansion of the pre-zone below, above, or through the rack arrangement allows free assignment of a very big number of sources (vertical conveyors) to sinks (work stations). Each work station can be supplied with articles from each vertical conveyor because FTF are used which can travel freely in the FTF plane. FTF-travelling paths can be defined arbitrarily since they can be put together from an almost infinite plurality of segments. The number of possible paths between one source and one sink is increased significantly compared to classic steady conveyors because fixed course of lines thereof can be omitted.

The storage and retrieval devices which are used in the rack aisles for storing and retrieving the articles can retrieve chaotically. The sequencing stage, which is typically associated with the storage and retrieval devices, can be omitted. The storage and retrieval devices can retrieve in a path-optimized manner, resulting in an increase of the performance (retrievals per unit of time). The material-flow computer is relieved because the planning effort associated with the storage and retrieval devices with regard to sequencing is omitted.

The system is easy to maintain and service is easy because the FTF in the FTF plane can be accessed better in comparison to the classic conveying line in the pre-zone, which is often very cramped. Additionally, there are no problems with regard to escape routes.

The FTF can be monitored in the FTF plane by means of cameras so that faulty or idle FTF can be localized easily.

The material-flow connection (course of lines) between the vertical conveyors (start/target location) and the work stations (target/start location) can be changed at any time which allows a new assignment of the vertical conveyors to the work stations at any time.

The simplification of the material flow achieved thereby from the vertical conveyors to the work stations allows supplying several work stations with articles on a steady-state overall area. Additionally, arbitrary regions of the warehouse can be accessed.

The overall performance of the system is increased.

Preferably, the FTF plane extends at least across an area enclosing the vertical conveyors. In particular, the FTF plane extends at least across an area which additionally encloses the racks and the rack aisles of the rack arrangement (in a top view) substantially completely.

Thus, each of the vertical conveyors can be reached by the FTF in the FTF plane which in turn allows each arbitrary assignment of the vertical conveyors to the work stations. The vertical conveyors in turn establish the material-flow connection between the racks and the FTF plane, and the work stations respectively.

The displacement of the FTF plane beneath, above, or into the rack arrangement leaves the base area of the system unchanged and increases, if necessary only, the required overall height by the height of the FTF plane.

Existing storage and order-picking systems, which include a classic pre-zone having steady conveyors, can be converted for achieving the advantages of the present invention.

With a particular embodiment each of the individual travelling orders defines, for the corresponding FTF, one of a plurality of possible travelling paths from one of the vertical conveyors to the at least one work station, and each of the individual travelling orders includes sequencing and overtaking information so that such of the FTF, which supply the at least one of the work stations in an order-orientated manner with the storage goods, can overtake each other and deliver the storage goods in the absolute order to the at least one work station.

The FTF-specific travelling paths, or travelling orders, are calculated by the fleet manager such that the articles, or storage goods, arrive at the work station in the absolute order. The fleet manager selects the course of the travelling path, start and arrival times, overtaking maneuvers, travelling velocities, and the like such that the articles, which are delivered chaotically from the vertical conveyors, arrive in the ascending or descending order at the work station. The final sequencing also happens in the FTF plane.

Further, it is advantageous to arrange each of the vertical conveyors adjacent to a plurality of transfer locations, which are respectively formed in a preferably rack-integrated manner.

This measure simplifies the path optimization of the retrieving storage and retrieval devices because these storage and retrieval devices can always travel to a closely arranged free transfer location.

With another preferred embodiment a material-flow computer is further provided, which is configured for generating path-optimized transport orders dedicated to the storage and retrieval devices and vertical conveyors.

Thus, two components being responsible for the material flow, namely the storage and retrieval devices and preferably also the vertical conveyors, move in a path-optimized manner. This means that the storage and retrieval devices and the vertical conveyors cover paths, which are as short as possible, during transport of the articles.

Preferably, each of the FTF is formed without a load-handling device and includes a passive receiving device.

This measure reduces the controlling effort and reduces the fabrication and sale costs of the FTF, which FTF are typically required in a huge number in the FTF plane.

Preferably, the travelling area further comprises at least one sequencing harp.

Further, it is advantageous to retrieve the articles, by the storage and retrieval devices, in a path-optimized manner.

The storage and retrieval devices cover paths as short as possible within the rack aisle for retrieving the articles, which are required by the picking order, and in particular for delivering same also to the transfer locations. The corresponding sequencing stage of the storage and retrieval devices is omitted so that planning effort is reduced. The retrieval performance within the rack arrangement is increased.

This applies the more if even the vertical conveyors are operated in a path-optimized manner.

In this case the sequencing stage, which can be realized by the vertical conveyors, is additionally omitted. The planning effort in the rack arrangement is further reduced with regard to sequencing. The retrieval performance of the rack arrangement is increased.

Preferably, the system comprises a plurality of work stations, wherein each of the work stations is coupable, in terms of material flow, to each of the vertical conveyors by means of the FTF via several possible travelling paths which can be combined freely.

In this case the possibility of freely assigning the sources to the sinks is again expressed. Transport-logistic assignment of the vertical conveyors to the work stations—and thus to the picking orders—can be changed at any time, for example, in order to balance out peak loads at one work station of the vertical conveyors.

In particular, the topology further comprises location information of the vertical conveyors and of other travelling obstacles in the travelling area.

In this manner it is possible to plan the travelling paths of the FTF so that they reach their destinations without traffic jams or stops.

According to a third aspect of the invention it is disclosed a method of supplying in a sequenced manner a work station with a plurality of articles, which represent a picking order and which are retrieved chaotically from racks of a rack arrangement by means of storage and retrieval devices which are moveable in rack aisles between oppositely arranged racks, and which articles are transported vertically by means of a plurality of vertical conveyors into an FTF plane comprising a plurality of autonomously moveable driverless conveying vehicles, FTF, and a travelling area, in order to be provided by means of the FTF on the travelling area, which includes a topology of way points and segments along which the FTF are moveable in a guided manner, in an absolute order at the work station, wherein each of the segments extends from one of the way points to another adjacent way point, and wherein related segments define a travelling path, the method comprising the steps of: determining a quantity of rack locations where articles are stored which are to be retrieved in accordance with the picking order; generating SRD-transport orders, dedicated to the storage and retrieval devices, and transmitting the SRD-transport orders to the corresponding storage and retrieval devices; retrieving and delivering the articles by means of the storage and retrieval devices in accordance with the SRD-transport orders; generating vertical-conveyor transport orders, dedicated to the vertical conveyors, and transmitting the corresponding vertical-conveyor transport orders to the corresponding vertical conveyors; vertically transporting the articles in the FTF plane by means of the vertical conveyors; generating FTF-dedicated individual travelling orders, which include navigation information, and transmitting the travelling orders to the corresponding FTF; executing the travelling orders by the corresponding FTF, wherein the corresponding FTF move along individual travelling paths, which are generated FTF-specifically, from the corresponding vertical conveyors to the work station, and handing over the articles in the absolute order at the at least one work station.

According to a fourth aspect of the invention it is disclosed a method of supplying, in a sequenced manner and preferably within a system of the second aspect above, a target location with a plurality of articles, which represent a picking order and which are retrieved chaotically from racks of a statically arranged rack arrangement by means of storage and retrieval devices, SRD, which travel in the rack aisles between oppositely arranged racks, and which articles are transported vertically by means of a plurality of statically arranged vertical conveyors into an FTF plane, which includes a plurality of autonomously moveable driverless conveying vehicles, FTF, and a travelling area, in order to be provided by means of the FTF on the travelling area, which comprises a topology of way points and segments along which the FTF travel in a guided manner, in an absolute order at the target location, wherein each of the segments extends from one of the way points to another adjacent one of the way points, and wherein related ones of the segments define a travelling path, the method including the following steps: determining a quantity of rack locations of the racks where the articles are stored which are to be retrieved in accordance with the picking order; generating SRD-transport orders and transmitting the SRD-transport orders to the corresponding storage and retrieval devices; retrieving and delivering the articles by means of the storage and retrieval devices in accordance with the SRD-transport orders; generating vertical-conveyor transport orders and transmitting the generated vertical-conveyor transport orders to the corresponding vertical conveyors; vertically transporting the articles into the FTF plane by means of the vertical conveyors; generating FTF-dedicated individual travelling orders, which respectively include navigation information and an FTF-specific individual travelling path, and transmitting the travelling orders to the corresponding FTF so that the storage goods, which are not yet transported by the vertical conveyors in an absolute order into the FTF plane, are transported along the FTF-specifically generated individual travelling paths from the vertical conveyors to the target location and are handed over in the absolute order to the target location; and executing the travelling orders by the corresponding FTF, wherein the corresponding FTF move along the FTF-specifically generated individual travelling paths from the corresponding vertical conveyors to the target location and hand over the articles in the absolute order to the target location.

Preferably, the retrieval of the articles is conducted by the storage and retrieval devices in a path-optimized manner.

The FTF plane extends in particular across an area which encloses the vertical conveyors and which preferably further encloses the racks and the rack aisles of the rack arrangement substantially completely.

According to a fifth aspect of teh invention it is disclosed a system for unloading a piece good from an FTF, the system comprising: an FTF including a top side; a receiving device, which is configured for an FTF, attached to the top side of the FTF and configured to transport the piece good; and a separating conveyor including an endless-circulating conveying device which is driven in a conveying direction parallel to the travelling direction; wherein the receiving device is attached, relatively to the separating conveyor on the FTF, and configured such that the separating conveyor can be moved, in a dived-in state, in a meshing manner through the receiving device while the FTF passes the separating conveyor from below.

The system allows a gapless, i.e. continuous, loading of the transport vehicles. Also, the system allows a gapless stream of piece goods unloaded. This is possible because stoppers are omitted which hold the piece goods during transfer. Further, this is possible because the loading and unloading happens parallel to the travelling direction, in particular in the travelling direction, of the FTF while the FTF continuously moves through the separating conveyor. The separating conveyor is driven and conveys the piece goods thus in the same direction like the FTF drives through the separating conveyor.

With a particular embodiment the separating conveyor defines a flat conveying surface which encloses an acute angle together with the transport surface.

Then, the separating conveyor dives, in a meshing manner, into the transport surface for lifting out the piece good actively due to its drive.

Preferably, the receiving device comprises finger-like projections at an end thereof, which is located downstream in a travelling direction of the FTF, which projections project perpendicularly from the transport surface.

The finger-like projections prevent, during loading of the FTF, that the piece good drops off the FTF or projects from the FTF at the front in the travelling direction. The finger-like projections act as stoppers. The finger-like projections assist in positioning the piece goods at a desired predetermined position on the receiving device itself.

With a particular embodiment the receiving device comprises a plurality of supporting lamellas for transporting the piece good thereon, wherein the supporting lamellas are orientated parallel to the travelling direction of the FTF, wherein each of the supporting lamellas comprises a top side on which the piece good can be deposited, wherein the top sides of the supporting lamellas define a substantially flat transport surface, wherein the supporting lamellas are distanced in a transversal direction, which is orientated perpendicular to the travelling direction, such that in the transport surface a, preferably regular, pattern of longitudinally extending parallel gaps is formed, wherein each of the gaps has a minimum depth, and wherein the conveying device comprises a plurality of individual conveyors which are arranged in a comb-prong-like manner parallel to the travelling direction of the FTF such that the individual conveyors contactlessly dive into the gaps in the transport surface while the receiving device is moved through the separating conveyor.

In particular, the supporting lamellas, in side view, comprise an L-shaped cross section.

The supporting lamellas can be manufactured easily. The L-shape of the cross section results in the desired finger-like projections at the downstream end of the supporting lamellas.

With another advantageous embodiment the individual conveyors are moved, during loading or unloading process, at a conveying velocity which substantially corresponds to a travelling velocity of the FTF.

This selection of the velocities assists the continuous gapless loading and unloading of the piece goods.

With another embodiment further a driven steady conveyor is provided which is arranged oppositely to an end of the separating conveyor which end is arranged higher.

Preferably, as many individual conveyors as gaps are provided.

This measure prevents that a small piece good falls through the separating conveyor.

With another embodiment each of the individual conveyors is an endless-circulating strap conveyor, or a small-roller conveyor which is preferably driven.

With another embodiment the separating conveyor is an endless-circulating belt conveyor, and the receiving device comprises an arrangement of flexible brushes being configured to carry the piece goods at a minimum distance relative to the top side of the FTF, wherein the brushes are so flexible that the separating conveyor, which dives into the receiving device, lays down the brushes, and the brushes automatically re-erect after passage.

In particular, an end region of the belt conveyor, which dives into the receiving device, is formed pivotally.

According to a sixth aspect of the invention it is disclosed a buffer station including the system of the fifth aspect of the invention and including a driven buffer-conveying system. According to a seventh aspect of the invention it is disclosed a work station including the system of the fifth aspect of the invention and at least one driven buffering line arranged adjacent to the separating conveyor.

It is clear that the above mentioned and hereinafter still to be explained features cannot only be used in the respectively given combination but also in other combinations or alone without departing from the scope of the present invention.

BRIEF DESCRIPTION OF THE DRAWINGS

Embodiments of the invention are illustrated in the figures and will be explained in more detail in the following description, wherein.

PREFERRED EMBODIMENTS OF THE INVENTION

Figure 1:
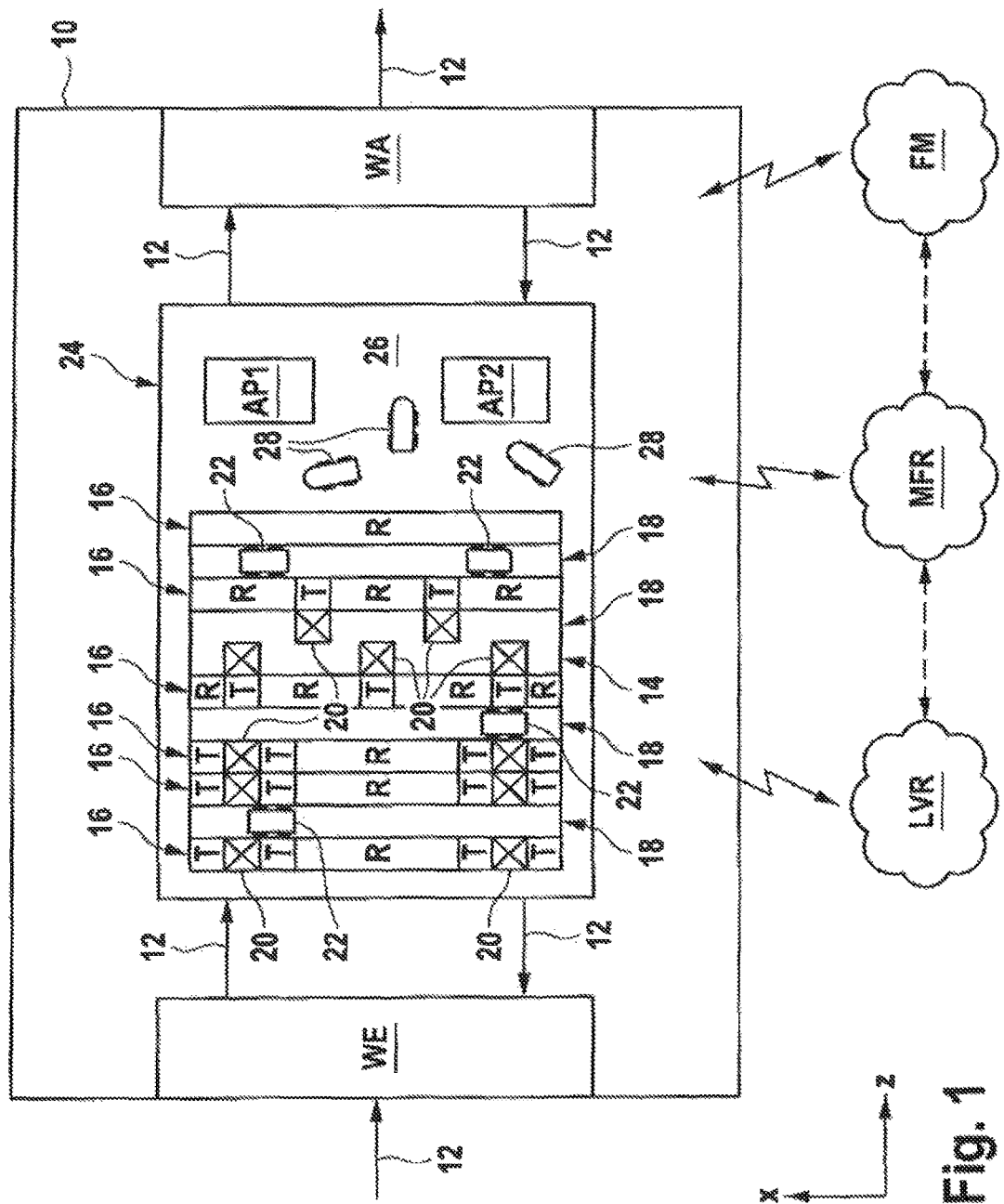
FIG. 1 shows a block diagram of a storage and order-picking system.

If vertical or horizontal orientations are mentioned in the following, it is clear that elements being associated with these orientations can be exchanged with each other by a corresponding rotation so that such orientations are not to be understood in a limiting manner.

As common practice in the field of (intra) logistics, in storage and order-picking systems (distribution systems, material-handling systems, etc.) a longitudinal direction is designated by "X", a transversal direction is designated by "Z", and a height direction is designated by "Y". The directions X, Y, and Z preferably define a Cartesian coordinate system.

A warehouse arrangement, or a rack arrangement, 14 is to be understood in the following as a plurality of racks 16 which most times are arranged parallel in terms of individual racks or double racks. Double racks are individual racks which are set up back-to-back. The racks 16 substantially extend longitudinally. Rack aisles 18 are defined transversally between the racks 16 and serve as action space of storage and retrieval devices 22 and for transfers of articles. The racks 16 terminate at (short) front sides which are respectively arranged oppositely and which in turn are orientated in a plane perpendicular to the longitudinal direction, i.e. to the (long) longitudinal sides of the racks 16 and to the rack aisles 18. The racks 16 itself comprise a plurality of (rack) storage locations, or deposition locations, R being arranged in rack planes which are arranged on top of each other. A rack row extends in the horizontal direction within a warehouse and typically comprises many storage locations, or deposition locations, R on top of each other and next to each other.

An "article" is to be understood in the following as a storage and/or picking unit within a storage and order-picking system 10. The storage unit, which is also designated a storage good, can include a storage-load support as well as the article itself. However, the storage unit can also include the article only if the storage-load support is omitted. Typically, load supports such as pallets, grid boxes, containers, recipients, cartons, trays, (hanging) bags, and the like are used as the storage-load supports. In particular, an "article" is to be understood as a piece good. The articles are (smallest) units of an article assortment which can be distinguished by an article type. Piece goods are individualized distinguishable articles which can be handled individually and inventory of which is handled piecewise or as a case. A "case" is a general term for a handable load unit which can be moved manually or by means of technical devices (such as conveying system, storage and retrieval device, load-handling device, etc.). Even a subquantity of a load unit such as a beverage box on a pallet, which is completely loaded with beverage boxes, is designated a case. The terms "article", "case", "storage good", and "piece good" are used equivalently in the following.

The terms "rack location", "storage location", "deposition location", "pallet location", and "buffering location" are used equivalently. These "locations" are to be understood as locations within the system 10 where the articles are stored. A "rack location" is a location where the articles are provided within a storage device (also for long times) for the purpose of picking. A "transfer location" is rack location being arranged adjacent to a vertical conveyor. The transfer location serves for temporarily buffering one or more articles and is connected, in terms of material flow, to the corresponding vertical conveyor for exchanging the article (s) with the vertical conveyor. The transfer location serves for de-coupling the vertical conveyors from the storage and retrieval devices. The vertical conveyors do not need to wait for the storage and retrieval devices, and vice versa, in order to transfer articles.

With the invention different types of conveyors can be used (such as roller conveyors, belt conveyors, chain conveyors, overhead conveyors, strap conveyors, etc.). The terms "conveyor", "conveyor line", and "conveying system" are used equivalently hereinafter. A conveying system includes substantially each technical and organizational device (such as drives, sensors, switches, controlling elements, etc.) for moving or transporting conveying goods (i.e. articles) and for directing material streams.

Further, the present invention is operated substantially in accordance with the "goods-to-man" principle. With the "goods-to-man" principle the to-be-picked articles are transported to an operator so that the operator, which is also designated a "picker" hereinafter, only needs to walk a little, or does not need to walk at all, for the sake of better ergonomics in order to conduct a picking process (order-orientated grabbing and delivering of articles). The to-be-picked articles are transported by means of the load supports within the system 10, particularly from and to picking stations (i.e. picking-work stations) and vertical conveyors 20.

A (picking) "order" consists of one or more order positions which are also called order lines. One order line indicates a respective quantity (number of pieces) of a type of article which has been ordered by a customer.

FIG. 1 shows a block diagram of a storage and order-picking system 10 which can be used, for example, as a distribution system of a retailer, or an online retailer. The storage and order-picking system 10 hereinafter is also briefly designated as the "system 10".

The system 10 comprises a goods receipt WE as well as a goods issue WA. Material flow 12 inside and outside the system 10 is indicated by arrows. The material flow 12 is performed within the system 10 preferably by using storage and retrieval devices 22, vertical conveyors 20, and a driverless transport system ("fahrerloses Transportsystem", FTS). If necessary, a conventional conveying system is used as well.

Between the goods receipt WE and the goods issue WA of FIG. 1 a rack arrangement 14 including a number of racks 16 is provided, which racks define (rack) aisles 18 between each other. The racks 16 extend substantially in the longitudinal direction X and are distanced to each other in the transversal direction Z. The material flow 12 in the height direction Y (perpendicular to drawing sheet) is conducted within the rack arrangement 14 substantially by means of vertical conveyors 20. The vertical conveyors 20 are also called elevators. In this context preferably steady conveyors are used for conducting the material flow 12 exclusively in the vertical direction Y. The vertical conveyors 20 are stationary, i.e. they do not move relative to the racks 16. The vertical conveyors 20 can be arranged outside or inside the racks 16. With an arrangement within the racks 16 one speaks of rack-integrated vertical conveyors 20. A corresponding rack arrangement 14 including rack-integrated vertical conveyors 20 is exemplarily described in WO 2012/113681, which is incorporated herewith by reference. Such rack-integrated vertical conveyors 20 are shown in FIG. 1, in particular in the first three racks 16 on the left-hand side. Beside the rack-integrated vertical conveyors 20 further vertical conveyor 20 can be provided within the rack aisles 18 additionally and/or alternatively. A corresponding arrangement is exemplarily described in WO 2007/134840 A1, which is incorporated herewith by reference. In FIG. 1 the second rack aisle 18 on the right-hand side is selected relatively broad. This rack aisle 18 can be formed smaller in the direction Z so that each of the vertical conveyors 20 is arranged adjacent to both racks 16 at the left-hand side and the right-hand side. The interstices in X can be filled by rack locations R.

In the rack arrangement 14 always a plurality of vertical conveyors 20 is assigned to, or associated with, the racks 16, which vertical conveyors 20 are arranged either within the racks 16 or in the rack aisles 18 in a distributed manner along the longitudinal direction X. However, the assignment (in terms of material flow) can also be made across one rack aisle 18, as exemplarily shown for the rack 16 in FIG. 1 which is arranged at the outermost right-hand side. In and at rack 16 being arranged at the outermost right-hand side of FIG. 1 no vertical conveyor 20 is arranged at all. The connection, in terms of material flow, happens via the storage and retrieval device(s) 22 to the rack 16 which is arranged adjacent at the left-hand side.

The storage and retrieval devices 22 (hereinafter also designated "SRD") retrieve storage goods, or articles, which are not designated and are not shown in more detail, from the rack locations R in the racks 16, or store the same into the rack locations R in the racks 16. For this purpose the SRD 22 are provided with load-handling devices (hereinafter also designated "LHD"), which are not designated and are not shown in more detail and by which the storage goods, or articles, are moved substantially in the direction Z for the purpose of storing and retrieving. The SRD 22 substantially move within the rack aisles 18 and serve for the material flow 12 in the direction X within the rack arrangement 14. If the SRD 22 are provided with masts, which are not shown and designated here in more detail, the SRD 22 cover the material flow 12 even in the height direction Y. The racks 16 can be vertically structured in a modular manner, wherein at least one SRD 22 is provided for each module. As a rule, the SRD 22 travel in a rail-guided manner. Corresponding rails are not depicted.

Without mast and without lifting functionality the SRD 22 merely operate one single rack plane. In this case one speaks of one-plane storage and retrieval devices which are also called shuttles (without lifting functionality). Any type of SRD can be used.

In general, the SRD 22 move preferably inside the rack arrangement 14 only. The material flow 12 outside the rack arrangement 14 such as from and to (picking) work stations AP is substantially performed by autonomous driverless transport vehicles 28 (hereinafter also designated "FTF") which are also called "shuttles" in the field of intralogistics. These FTF, or shuttles, 28 move outside the rack arrangement 14 in the FTF plane 24, which includes a travelling area, or action area 26.

In FIG. 1 exemplarily two work stations AP1 and AP2 are shown. The work stations AP are arranged preferably along the longitudinal side(s) of the rack arrangement 14 in the FTF plane 24 so that the material flow 12 towards the work stations is substantially performed in the transversal direction Z by the FTF 28. More or less work stations AP can be provided. The work stations AP are arranged in the area 26 and are coupled, in terms of material flow, to the rack arrangement 14 via the FTF 28. The FTF plane 24 can be provided, preferably in terms of one single flat, horizontal plane beneath, above, or within the rack arrangement 14. The FTF plane 24 is connected, in terms of material flow, via the vertical conveyors 20 to the racks 16.

If picking is performed at one of the work stations AP1 or AP2 the SRD 22 retrieve the corresponding articles in an order-orientated manner from the rack locations R, transport the retrieved articles substantially horizontally to transfer locations T being arranged oppositely to the vertical conveyors 20 within the racks 16, instead of rack locations R, and being configured for exchanging the articles with the vertical conveyors 20. The vertical conveyors 20 retrieve the articles being buffered, preferably in a double-deep manner, from the transfer locations T, and transport same in the vertical direction Y into the FTF plane 24. In the FTF plane 24 articles, which are provided by the vertical conveyors 20, are delivered to the FTF 28 which in turn move the delivered articles to the corresponding target locations, namely, for example, to the work stations AP1 and/or AP2. Corresponding travelling paths, or ways, (routes in terms of navigation) are determined by a fleet manager FM (controlling software including corresponding hardware) in an order-orientated and sequence-orientated manner and are communicated individually to the FTF 28. The fleet manager FM can be part of a superordinated material-flow computer MFR (hardware and software), which in turn can be part of a warehouse-management computer LVR (hardware and software). In FIG. 1 these controlling components FM, MFR, and LVR are shown as separate components which are independent from each other.

Figure 2A:
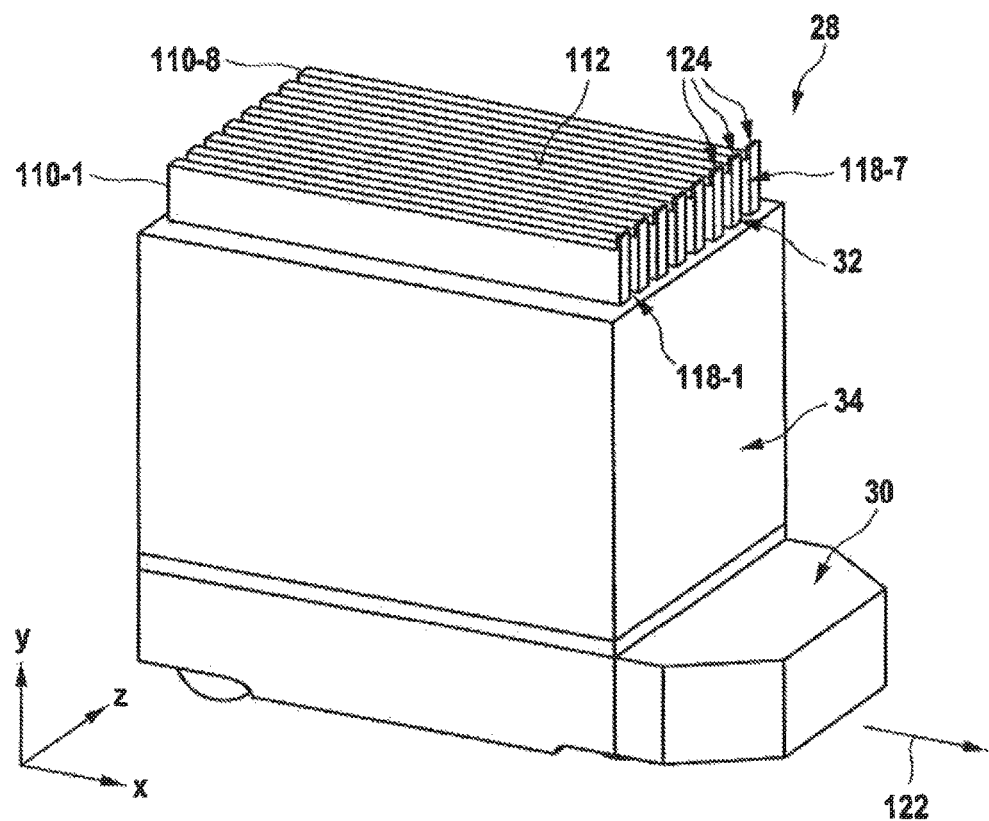
FIG. 2 shows an FTF including a top (FIG. 2A), and an FTF without top (FIG. 2B)
Figure 2B:
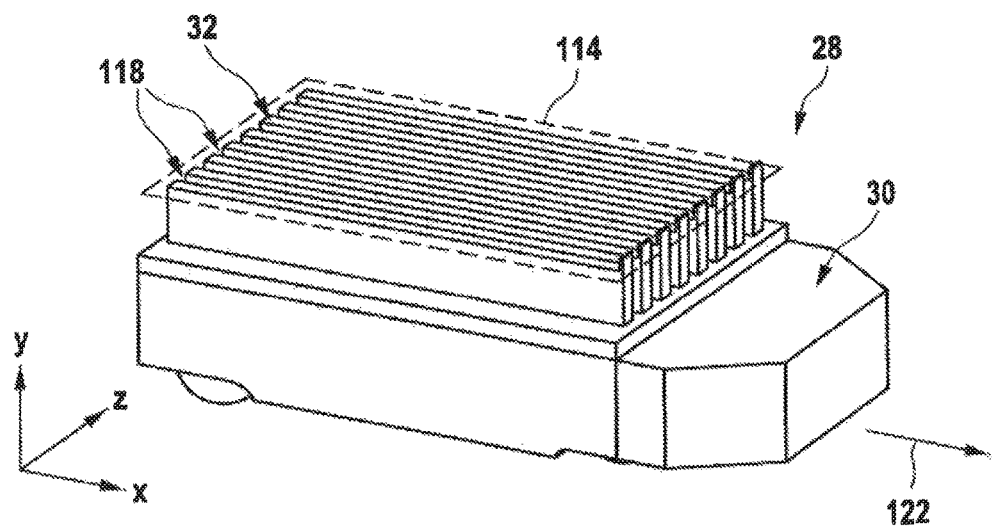

The FIGS. 2A and 2B show perspective views of a first embodiment of one FTF 28. FIG. 2A shows one FTF 28 being adapted for operating in hip height of a picker by providing an (elevation) top 34 between the actual vehicle 30 and a, e.g., lamella-shaped (article) receiving device 32 so that a top side of the receiving device 32 is located at a height of about 700 mm. In FIG. 2B the identical vehicle 30 is shown together with an article receiving device 32, but without a top 34.

In general, the FTF 28 are automatically guided vehicles which solve transport tasks fast, cheap, and scalable in the system 10. Preferably, the FTF 28 move along a pre-defined transport network which is formed, for example, by black lines which are adhered, or painted, onto a bottom of the area 26 (cf. also FIG. 4). For example, several RFID markers can be provided along this transport network for implementing way points 44 which are exemplarily shown in FIG. 5. A line between two adjacent way points 44 is designated hereinafter as a segment 46. It is clear that the segments 46 can also be realized in terms of virtual connecting lines, for example, if an internal GPS system or laser-navigation system is used. The same applies for the way points 44. The geometrical dimension of the area 26, the way points 44, and the segments 46 define a topology of the FTF plane 24. This topology is to be understood as a "map" of the FTF plane 24, if necessary including location descriptions of the vertical conveyors 20, rack posts, and other (travelling) obstacles.

The FTF 28 can buffer articles and can transport articles from and to pre-determined stations (such as the work stations AP) or retrieve same from there. Loading and unloading of the FTF 28 preferably is performed passively. For example, this means that the FTF 28 do not comprise sensors for identifying articles or for actively initiating loading and unloading processes. Passive loading and unloading, for example, by utilization of ramps will be described hereinafter in more detail with reference to FIG. 8ff.

Exemplary FTF 28 as well as components thereof and a controlling method are described in the documents DE 10 2012 023 999 A1, DE 20 2013 010 696 U1, and DE 10 2012 006 738 A1, which are referred to herewith.

A group of FTF 28, which belong together, hereinafter is also designated as a fleet in the common transport network. Fleet control (generating, distributing, and controlling FTF-travelling orders) is performed by the fleet manager FM. The fleet control can be executed, for example, as a separate Java application being connected to the FTF 28 through TCP (WiFi) and being connected to the material-flow computer MFR through another, preferably proprietary, communication protocol (LAN). This will be explained in more detail later.

Each of the FTF 28 can comprise one or more of the following mentioned components: a camera for following the black lines of the transport network; a distance sensor for detecting obstacles or other FTF 28 in the environment; a WiFi module for communicating with the fleet manager FM; an exchangeable (power) accumulator; a microcomputer, or microcontroller, for local vehicle controlling; a storage module for recording travelling orders and, for example, referring to the topology; and/or an RFID reading device for detecting the way points 44. The way points 44 can also be realized as QR codes. The power supply can be performed alternatively by means of PowerCaps which can be exchanged at exchanging stations, wherein even inductive charging stations can be used additionally.

Each of the FTF 28 is configured to follow the black lines and to maintain a distance, which is required at minimum, to other FTF 28, in particular to the ones driving ahead. During operation the FTF 28 respectively receive a list of segments 46 from the fleet manager FM which are to be passed subsequently and which define one or more FTF-specific travelling orders, or travelling paths. For each of the FTF 28 an individual travelling path, or a route, is calculated by the fleet manager FM. Each of the FTF 28 knows the topology of the transport network, for example, for travelling from one way point 44 to an adjacent way point 44 in accordance with specifically selected segments 46, or for calculating travelling time, or for stopping at predetermined positions. For this purpose the topology of the transport network is transmitted by the fleet manager FM to the FTF 28, preferably during start of system.

Figure 3:
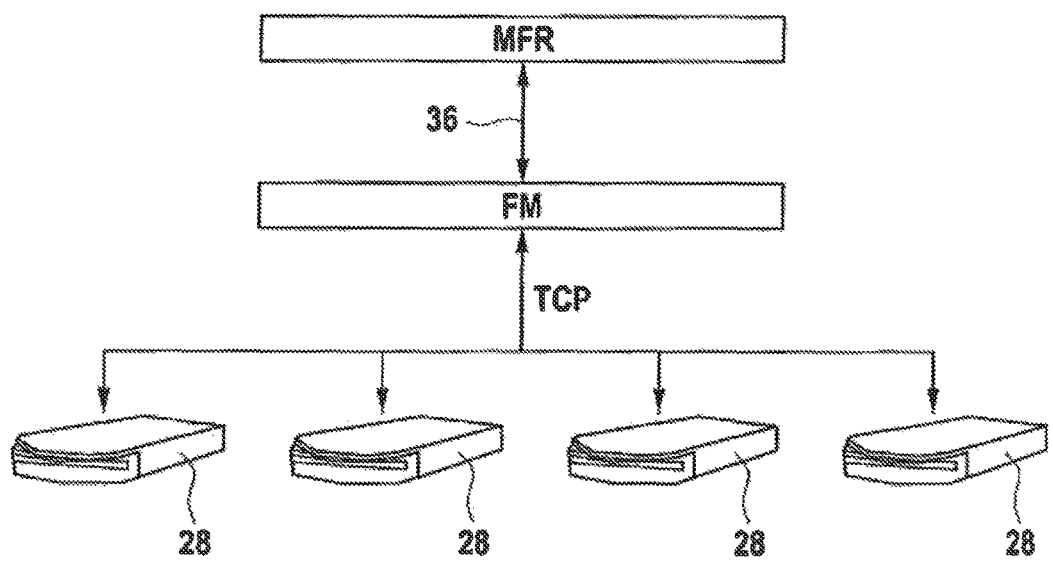
FIG. 3 shows architecture of a material-flow computer.

FIG. 3 generally shows architecture of the FTF 28 and control thereof. The material-flow computer MFR is a conventional controlling system for organizing transports in a warehouse upon utilization of different hardware systems. The material-flow computer MFR communicates via a (preferably proprietary) communication protocol 36 with the fleet manager FM. Each of the FTF 28 is assigned to a fleet manager FM, wherein each transport network is controlled preferably by its own fleet manager FM. It is clear that several fleet managers FM can be operated in parallel in the system 10. However, in this case there are also several fleets of FTF 28.

In general, the fleet manager FM represents a controlling module for each of the FTF 28 in the transport network. Also, the FM is responsible for executing and confirming transport orders, or FTF-specific travelling orders, in the transport network. The transport orders are received by the FM from the MFR. After receipt of the transport orders the FM selects appropriate FTF 28, calculates travelling paths, or routes, and transmits the corresponding lists of the required segments 46 as FTF-travelling orders to the selected FTF 28. At the manufacturers end the FTF 28 are not provided with information referring to a project-specific warehouse layout (rack arrangement 14). The required information with regard to the topology of the transport network is transmitted by the FM to each of the FTF 28, for example, during a configuration phase. FTF-travelling orders and FTF configurations are transmitted, for example, via the TCP connection.

Integration of one of the FTF 28 into the fleet control represents a separate process. For this purpose each relevant FTF parameter is defined. Corresponding files are read automatically when the FM is started. Further, project-specific network parameters are transmitted to the FTF 28. This file includes a list of each FTF 28 used and defines each parameter required for each of the FTF 28. The subsequent data can be included within the corresponding files: a unique serial number of the respective FTF 28 which is provided by the manufacturer; a fleet number; a number of the respective FTF 28 within the fleet; a home point such as an (RFID) code of one of the way points 44; a charging point for charging a battery of the FTF 28; the IP network address of the FM; a charging state; a failure state; a count of a kilometer meter or an operating-hour meter; or other parameters which are required for communication within the network and navigation within the transport network.

The transport network includes the way points 44 as well as the segments 46 which connect two way points 44, preferably unidirectionally, to each other. Each of the way points 44 has assigned its dedicated ID code. Each of the segments 46 physically corresponds to one of the black lines, which can be formed straight or curved, on the bottom of the area 26 (cf. FIGS. 4 and 5). The topology of the transport network, i.e. the arrangement and the locations of the way points 44 and the segments 46 therebetween, are known to the FM and the FTF 28. However, both components require different data information. For example, the FM merely requires a logical topology of the transport network, whereas the FTF 28 should know an accurate length of each of the segments in order to be able, for example, to stop correctly at one target-way point 44 by calculating the travelling time and distance covered for braking in advance.

Hereinafter an interface between the FM and the FTF 28, in particular the communication therebetween, is described.

After start, or re-start, each of the FTF 28 activates path and distance controlling. If a path (black line) is not detectable the FTF 28 stops without moving. Otherwise is follows the line until a first way point 44 (e.g., RFID marker) is reached. If further FTF 28, or other obstacles, are detected along the path the affected FTF 28 needs to wait. After that the FTF transmits a configuration inquiry to the FM which includes a serial number of the FTF 28 and the RFID code of the current way point 44. This inquiry is repeated (periodically) until the FM transmits an appropriate configuration to the FTF 28 which has put the inquiry. The configuration answer of the FM includes the topology of the entire transport network as well as other project-specific parameters such as an FTF-ID and a fleet ID. The FTF 28 saves each information and is then ready for FTF-travelling orders from the FM.

For moving one of the FTF 28 through the transport network the FM transmits an FTF-travelling order to the FTF 28. The FTF-travelling order includes an order ID, which comes originally from the MFR, as well as a list of the segments 46. Further, optional parameters can be included for determining, for example, a maximum velocity and acceleration of the FTF 28. The segments 46 are attached to a current internal route of the affected FTF 28, which route can be empty. This means that the FM expands the internal route of the FTF 28. As long as a current internal route of the FTF 28 is not empty, the FTF 28 continues its travel. Each time when a way point 44 is passed, i.e. a corresponding RFID marker is detected, the FTF 28 removes the first segment of the internal route and transmits an FTF-status report to the FM including the remaining route and the corresponding RFID code of the last way point 44. If the FTF 28 reaches the last segment 46 of the internal route it decreases automatically its velocity and stops accurately at the corresponding way point 44. The resulting FTF-status report then includes an empty remaining route. Typically, the FM always transmits a new FTF-travelling order in cases when the internal remaining route only includes three segments 46 at maximum which need to be travelled to.

Hereinafter an interface between the FM and the MFR is described. It is also described how the communication between the FM and the MFR runs. Typically, this communication happens via a (proprietary) communication protocol. It is to be noted that an FM can also communicate with a plurality of MFR if required.

Typically, the MFR has no knowledge of the number, type, or specific characteristics of the different FTF 28 in the fleet. The MFR communicates only with the FM for directing, or navigating, one of the FTF 28 to the desired way point 44. For this purpose the MFR needs to know the RFID code of each relevant way point 44. Typically, each of the way points 44 is associated with a loading station or unloading station dedicated to the FTF 28, which will be explained in more detail below.

If the FM receives a transport order from the MFR, the FM selects automatically an appropriate FTF 28. If the FTF 28 arrives at the target-way point 44 the FM transmits a corresponding notification to the transport MFR that the transport order is completed.

In particular, each of the transport orders defines an order ID. The order ID is used for tracking. The order ID is transmitted to the FTF 28. However, the order ID can also be used for continuing a previous movement by means of the identical FTF 28 for preventing, for example, an automatic selection of the FTF 28 by the FM.

If the FM receives a new transport order the FM first checks whether there is an FTF 28 being associated with this order ID. If yes, the FM preferably uses this pre-selected FTF 28 for executing the order. In order to be able to execute this order the FTF 28 have knowledge of the order IDs.

Exemplary transport orders are: loading order; unloading order; and/or travelling order.

Also, the FM is responsible for avoiding collisions at intersection points (way points 44).

Figure 4:
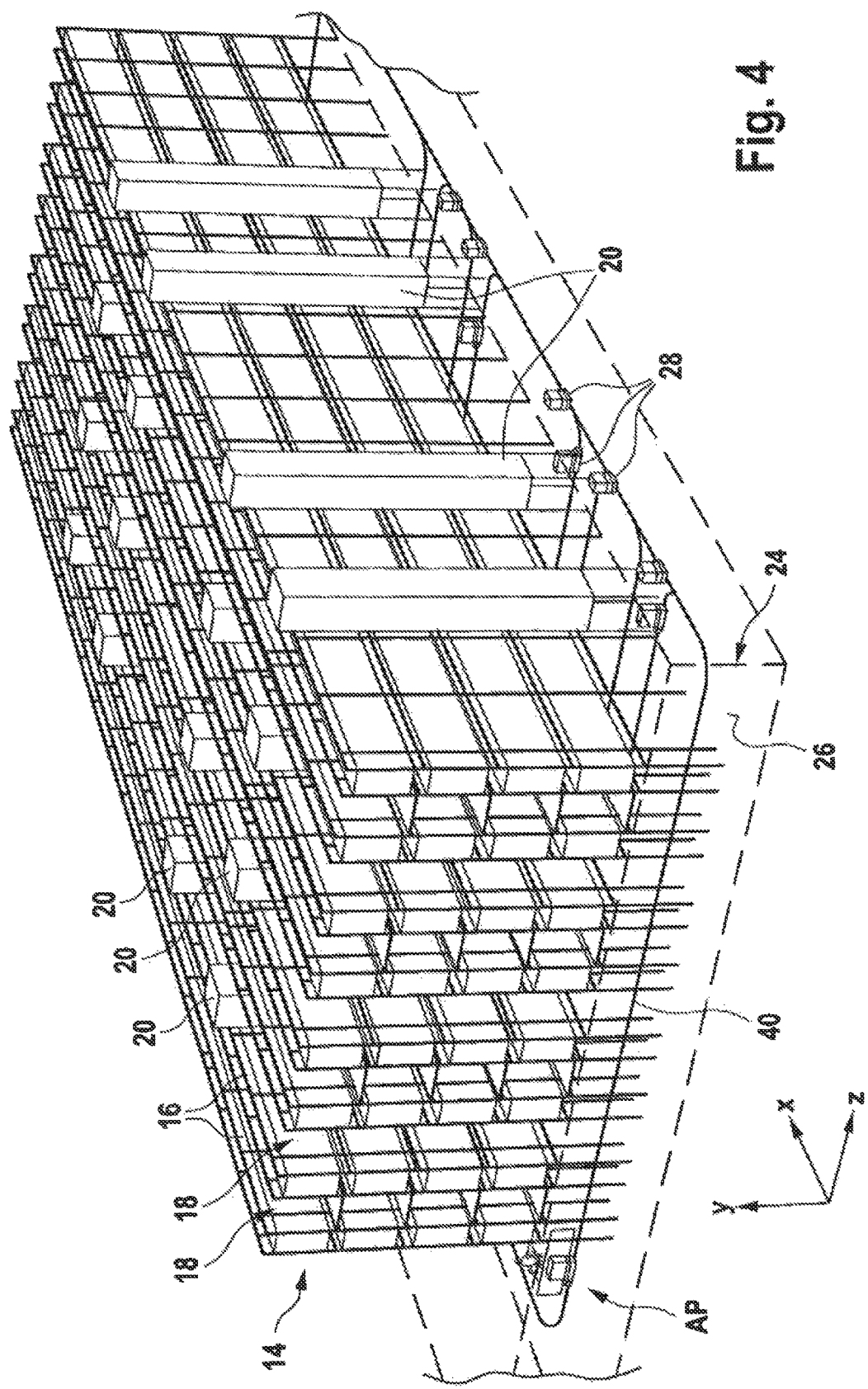
FIG. 4 shows a perspective view of an FTF plane beneath a rack arrangement.

FIG. 4 shows a perspective view of an embodiment of the system 10 where the FTF plane 24 is arranged beneath the racks 16 of the rack arrangement 14 and extends across a base area of the rack arrangement 14. The vertical conveyors 20 are arranged laterally to the racks 16 in rack aisles 18. Each of the racks 16 is coupled in terms of material flow to several ones of the vertical conveyors 20. In FIG. 4 respectively four rack modules, which are not designated in more detail, are arranged on top of each other. Each of the rack modules is operated by at least one (not shown) SRD 22 within the corresponding rack aisles 18. In the rack aisles 18, where the vertical conveyors 20 are arranged, no SRD 22 travel. Vertically-orientated rack posts (posts) of the racks 16 reach into the (three-dimensional) FTF plane 24 and represent, in this sense, obstacles for the FTF 28, which can travel on the travelling area 26 along travelling paths 40 (black lines). It is clear that the FTF 28 can also be guided differently in an automated manner such as by means of a local GPS system, which does not require the black lines, by means of inductive loops, or by means of a slide-member guidance in grooves provided in the bottom of the area 26 and defining the travelling paths 40, or the segments 46.

Further, exemplarily one work station AP is shown in the FTF plane 24 of FIG. 4, which work station is coupled in terms of material flow to the racks 16 through the FTF 28. The FTF 28 can move freely beneath the racks 16 along the travelling paths 40. The FTF plane 24 is formed without, i.e. free of, barriers, particularly free of rack locations R, with the exception of the rack posts and the frames of the vertical conveyors 20. The travelling paths 40 are selected such that the FTF 28 do not collide with the rack posts or the (machine) frames of the vertical conveyors 20.

Figure 5:
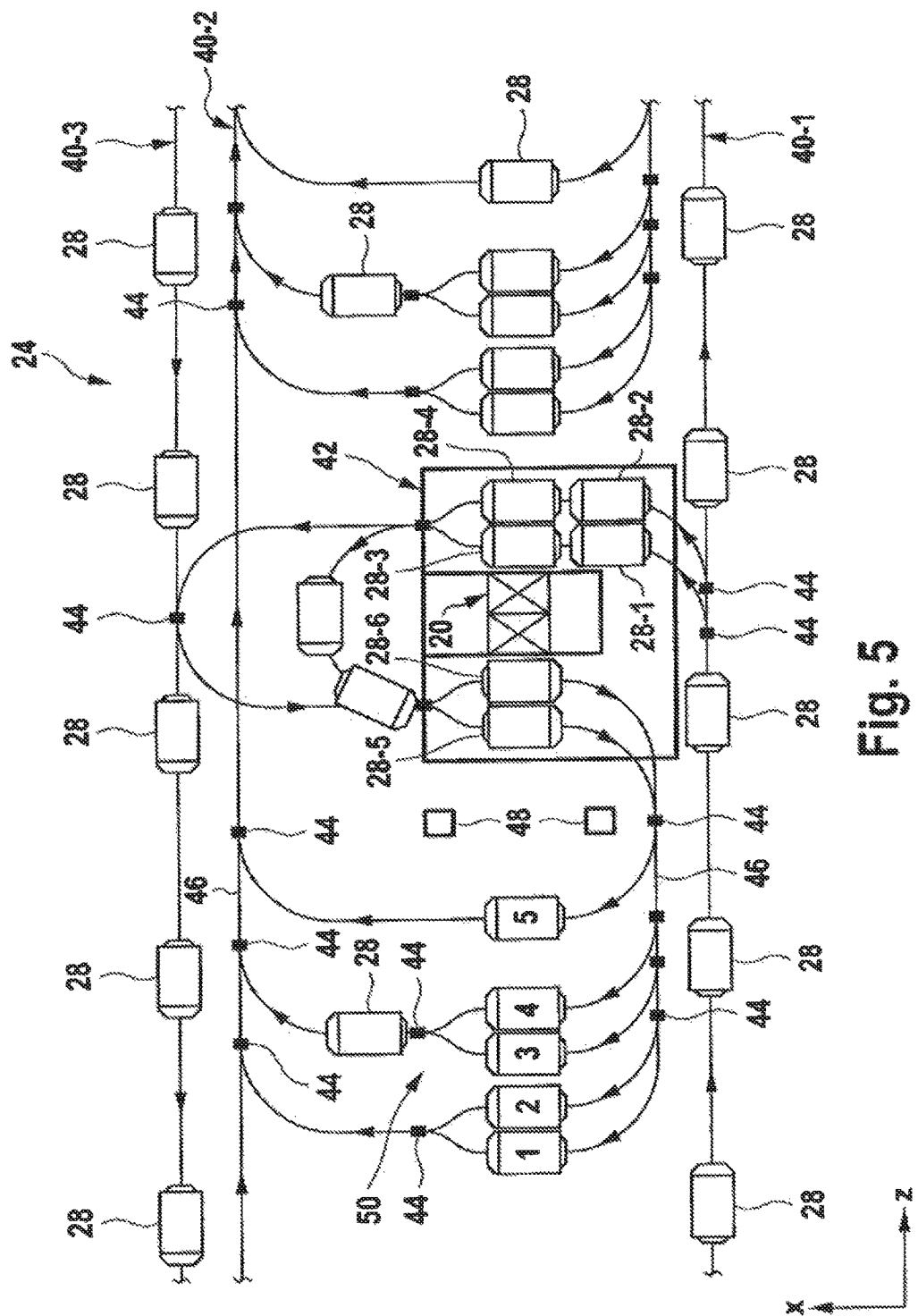
FIG. 5 shows a top view of a portion of an FTF plane.

FIG. 5 shows a top view of a portion of an FTF plane 24. An elevator arrangement 42 is arranged centrally in FIG. 5 and comprises a vertical conveyor 20 having two locations being arranged directly next to each other in Z. In this way double-deep handling is possible. Further, three travelling paths 40-1 to 40-3 are shown extending substantially horizontally in FIG. 5 along the longitudinal direction X and being respectively composed of a plurality of segments 46. Transport and travelling directions of the FTF 28 are indicated by little black triangles. In FIG. 5, a first travelling path 40-1 runs below, from the left to the right, for guiding the FTF 28 from the goods receipt WE (cf. FIG. 1) for the purpose of storing articles towards the vertical conveyors 20. A second parallely displaced travelling path 40-2 is shown above which directs the FTF 28 from the left to the right towards the work stations AP for the purpose of, for example, picking. On top of that and in parallel thereto another travelling path 40-3 is shown where the FTF 28 move from the right to the left for getting from the work stations AP to the goods issue WA. Further, the way points 44 are shown exemplarily in terms of little black squares (QR code, RFID code, bar code, etc.). Rack posts 48 are indicated by bigger black squares. The travelling paths 40 are arranged such that the FTF 28 do not collide with the rack posts 48.

In the following the elevator arrangement 42 of FIG. 5 will be considered in more detail. The two locations of the vertical conveyor are arranged directly next to each other in the direction Z. The LHD of the vertical conveyor, which LHD is not shown and designated in more detail, is configured to actively exchange articles with the FTF 28. For this purpose the vertical conveyor 20 can comprise, for example, prongs which can be extended in Z and which mesh, for example, with the receiving devices 34 (cf. FIG. 2), or lateral gripping devices for lifting or depositing the articles in a double-deep manner. The LHD of the vertical conveyor 20 can also be configured for single-deep or multiple-deep handling of the articles. The LHD of the vertical conveyor 20 can be provided further with steady conveyors for moving articles between itself and the FTF 28.

The elevator arrangement 42 comprises a spatial region in which articles are exchanged between the FTF 28 and the vertical conveyor 20. At the right-hand side adjacent to the vertical conveyor 20 two segments 46 extend which are arranged in parallel within the direct region of the vertical conveyor 20 and which substantially extend in the transversal direction Z. Also, at the left-hand side adjacent to the vertical conveyor 20, two segments 46 extend which in turn extend parallel in the transversal direction Z within the direct region of the vertical conveyors 20-1 and 20-2. In FIG. 5 four FTF 28-1 to 28-4 are shown at the right-hand side adjacent to the vertical conveyor 20, which FTF transport the articles towards the vertical conveyor 20 for the purpose of storing. The FTF 28-5 and 28-6 serve for retrieving articles from the rack arrangement 14 arranged on top thereof, which articles are moved to the level of the FTF plane 20 by means of the vertical conveyors 20. The FTF 28-5 and 28-6 travel via the second travelling path 40-2 to a work station AP being pre-determined by a (picking) order, which work station corresponds in this case to the target location. On its way to this target location the FTF 28-5 and 28-6 can pass a sequencing harp 50.

In FIG. 5 the sequencing harp 50 is provided at the left-hand side of the elevator arrangement 42 and exemplarily includes five travelling paths 40 extending initially in parallel to each other for bringing articles, which have been retrieved chaotically with regard to a sequence, into a defined order which order is preset, for example, by a picking order. In the example of FIG. 5 the articles are to be sorted ascendingly from the left to the right in the order "1-5". Independent of an order in which the articles are brought by the vertical conveyors 20-1 to 20-2 into the FTF plane 24, the articles can be brought into the preset order by means of the sequencing harp 50. The corresponding FTF 28 are called-off, as soon as they have arrived in the defined order within the sequencing harp 50, via the travelling path 40-2 towards the work station AP. When having arrived at the work station AP, which is not shown in FIG. 5, the articles can be retrieved in the preset order. In this case, the FTF 28 preferably are empty again and can transport either completely picked orders via the third travelling path 40-3 to the goods issue WA, or can be directed back to the elevator arrangements 42 from there for picking up further articles from the vertical conveyors 20. The empty FTF 28 can also travel to the WE for transporting to-be-stored articles to the vertical conveyors 20.

Similar applies for the FTF 28 which have provided articles for storage. As soon as the vertical conveyors 20 have taken over the articles the correspondingly emptied FTF 28 can either accept travelling orders for bringing retrieved articles from the rack arrangement 14 to the work stations AP or for travelling to the goods issue WA, which in turn is connected to the goods receipt, in order to be re-loaded there for the purpose of storage.

The sequencing, i.e. the arrangement of the articles in accordance with a desired order, is performed finally in the FTF plane 24 by calculating, coordinating, and outputting the FTF-travelling orders by means of the fleet manager FM. Sequence formation in the region of the rack arrangement 14, which typically is established by the SRD 22 during retrieval of the articles from the rack locations R and/or during storing of the retrieved articles into the transfer locations T, is not required. The SRD 22 (cf. FIG. 1) pick up the articles, which belong to one order, in a path-optimized manner. Path-optimized means that the articles are retrieved by the SRD 22 without considering any sequence. The retrieved articles can be provided to the vertical conveyors 20 in a non-sequenced manner, i.e. not yet in the desired ascending or descending (absolute) order, at the transfer locations T (buffer locations in the rack 16), wherein a pre-sequencing happens here, in particular if the articles are handled multiple-deep. The absolute order, in which the articles belonging to one single picking order need to be provided, for example, in accordance with a packing pattern on the target-load support, at the work station AP is irrelevant at this point. The final sequencing happens exclusively in the FTF plane 24. The selection of the vertical conveyor 20 merely represents an optional pre-sequencing, which, however, preferably does not happen, and does not need to happen either. The selection by the SRD 22 of the to-be-retrieved articles within the rack 16 preferably is performed exclusively in a path-optimized manner, i.e. the paths of the SRD 22 are selected as short as possible, resulting in a chaotic retrieval from the rack locations R. Only the selection of the transfer locations T, to which the retrieved articles are delivered by the SRD 22, can be considered in terms of pre-sequencing.

The big article streams, for the purpose of storing and retrieving, can be handled in the FTF plane 24 because many of the FTF 28 can travel freely within the FTF plane 24 along preset travelling paths 40. There is sufficient space in the FT plane 24, even for sequencing tasks. A conventional conveying system does not offer the buffering possibilities required for the sequencing, particularly not for de-coupling the machines (vertical conveyors 20, SRD 22, and conveying system between each other).

Figure 6:
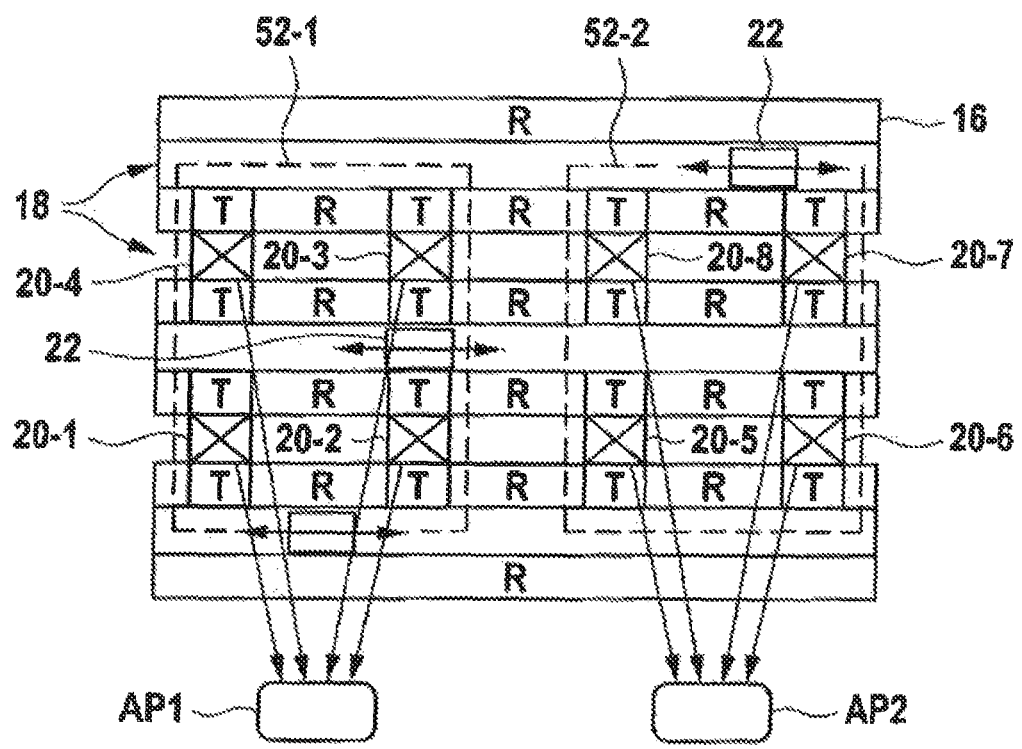
FIG. 6 shows a block diagram in top view for illustrating an assignment of vertical conveyors to work stations.

FIG. 6 serves for the illustration of an assignment of vertical conveyors 20 to work stations AP. Three rack blocks, which are not designated in more detail, and two work stations AP1 and AP2 are shown. Each of the rack block comprises two racks 16 defining one rack aisle 18 therebetween in which SRD 22 can travel for storing and retrieving articles in and from the rack locations R. The vertical conveyors 20 are arranged adjacent to the rack 16 between the rack blocks. In total eight vertical conveyors 20-1 to 20-8 are shown which are divided into two elevator groups 52-1 and 52-2. The vertical conveyors 20-1 to 20-4 belong to the first elevator group 52-1. The vertical conveyors 20-5 to 20-8 belong to the second elevator group 52-2.

The first elevator group 52-1 is assigned to the first work station AP1. The second elevator group 52-2 is assigned to the second work station AP2. This assignment is indicated by arrows in FIG. 6. Each of the elevators, or vertical conveyors, 20-1 to 20-8 serves for the supply of the work station AP assigned thereto. The transport of the articles is performed via the FTF 28 which are not shown in the FIG. 6. Each of the elevator groups 52-1 and 52-2 can have assigned a dedicated fleet of FTF 28. Independent of an order, by which the vertical conveyors 20 supply the articles in the FTF plane 24 to the corresponding elevator groups 52-1 or 52-2, the FTF 28 can transport the supplied articles in the desired order, i.e. in a sequenced manner, to the respective work station AP.

A number of the FTF 28, which form a fleet, can vary at any time. For example, if the second elevator group 52-2 is required to bring extraordinary many articles to the work station AP2, FTF 28 belonging to the first fleet which in turn is assigned to the first elevator group 52-1 can be assigned temporarily to the second elevator group 52-2. Alternatively, one of the vertical conveyors 20-1 to 20-4 of the first elevator group 52-1 can be assigned for a certain time to the second elevator group 52-2. In this way, for example, the vertical conveyor 20-3 can be assigned together with its FTF 28 to the second elevator group 52-2 for a certain time.

It is clear that the vertical conveyors 20 of an elevator group 52 can also be arranged remotely to each other. It is not required that all of the vertical conveyors 20 of an elevator group 52 are arranged directly adjacent to each other. The FTF 28 allow material-flow connection of even far away arranged vertical conveyors 20 to a corresponding work station AP. This free possibility of assignment of the FTF 28 to the vertical conveyors 20, or to the work stations AP, and the material streams resulting therefrom cannot be represented by a conventional pre-zone or a conveying system thereof. The conventional conveying system is a steady conveyor, course of lines and course of which are fixedly given and cannot be changed without efforts in short time, and particularly not temporarily.

Figure 7A:
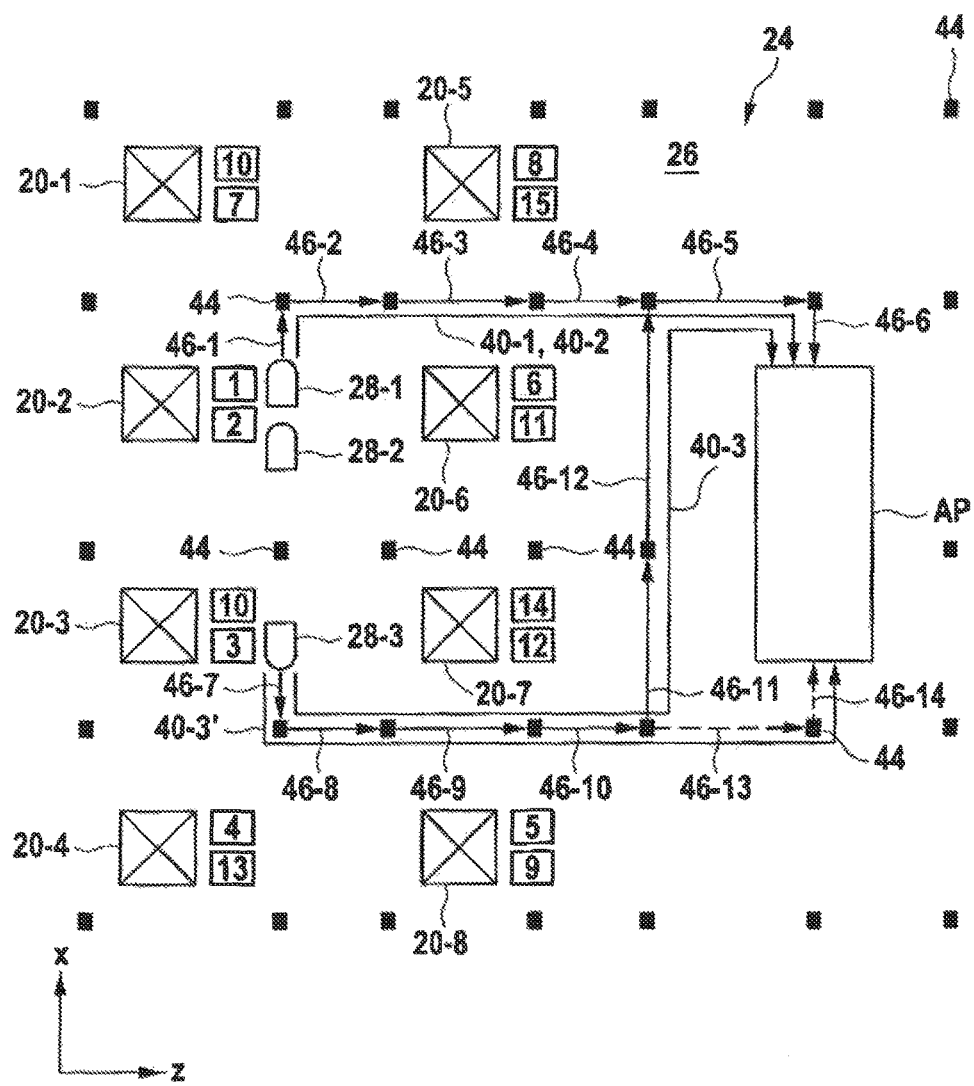
FIG. 7 shows a top view (FIG. 7A) of an FTF plane for illustrating possible travelling paths, and a top view (FIG. 7B) of a topology for illustrating possible segments.

FIG. 7A serves amongst other things for the illustration of a sequencing process. FIG. 7A shows a top view of an FTF plane 24 which exemplarily encloses (geometrically), amongst other things, eight vertical conveyors 20-1 to 20-8 as well as one work station AP. The racks 16, which are arranged on top of beneath, are not shown. Respectively at the right-hand side adjacent to the vertical conveyors 20 two rectangles including a number between 1 and 16 are shown. These rectangles represent sixteen articles which are required for processing an order at the work station AP in an ascending order from #1 to #16. These articles are deposited, for example, on transfer locations T (or handing-over locations in the FTF plane), which are not depicted here, of the vertical conveyors 20 and have been deposited by the SRD 22 "chaotically" on the transfer locations. "Chaotically" in this context means that the SRD 22 have retrieved the articles without considering any sequence, i.e. in a non-sequenced manner, from the racks 16 and have deposited the same—optionally in a pre-sequenced manner—on the transfer locations T. Preferably, at least the retrieval process is conducted in a path-optimized manner. This means that the SRD 22, if they are free, i.e. not loaded, take each of the articles of the order during passage of a corresponding rack location R and deliver same to the next free transfer location T. Thus, the articles are distributed chaotically over the vertical conveyors 20-1 to 20-8.

It is clear that the shown assignment (two articles for vertical conveyor 20) is merely selected for the purpose of a simplified explanation, in order to mask out a temporal component. Of course, each of the vertical conveyors 20 can transport—over time—more than two articles into the FTF plane 24 as soon as an assigned transfer location T, or handing-over location, is free again. FIG. 7A shows a snapshot where the SRD 22 have deposited each of the articles #1 to #16 on the transfer locations T or where the articles #1 to #16 have already been moved into the FTF plane 24 to handing-over locations. The handing-over locations are located in the FTF plane and represent the locations, or regions, where the vertical conveyors hand the articles over to the FTF 28. In this context devices can be used which are arranged separately to the vertical conveyors. However, even the vertical conveyors 20 can be used, for example, if the LHD thereof is located in the FTF plane 24 for the purpose of handing-over to the FTF 28.

At the work station AP of FIG. 7A the articles are required in an ascending order #1 to #16. For this purpose the fleet manager FM (not depicted) issues to a first FTF 28-1 a first FTF-travelling order for transporting the article #1 from the vertical conveyor 20-2 via a travelling path 40-1 to the work station AP including the segments 46-1 to 46-6 along the way points 44. A second FTF 28-2 gets an FTF-travelling order for the transport of the article #2 from the vertical conveyor 20-2 to the work station AP. The travelling path 40-2 of the second FTF 28-2 also includes the segments 46-1 to 46-6. The article #3 needs to be retrieved from the third vertical conveyor 20-3. The FM issues to a third FTF 28-3 a third FTF-travelling order defining an FTF-specific travelling path 40-3 which includes, for example, the segments 46-7 to 46-12 and 46-5 as well as 46-6. It is clear that the FTF-travelling orders are adjusted temporarily to each other such that the articles #1 to #3 arrive in the desired ascending order at the work station AP. In this context the selection of the travelling path 40, or the selection of the corresponding segments 46, can have an influence on the order, i.e. sequence.

In FIG. 7A an alternative travelling path 40-3' is shown for the third FTF 28-3 (cf. dashed lines). This alternative travelling path 40-3' includes the segments 46-7 to 46-10, 46-13 and 46-14. This alternative travelling path 40-3' is shorter than the other travelling path 40-3 of the third FTF 28-3. Assuming that each of the FTF 28 travels at the identical (constant) velocity, the third FTF 28-3 arrives earlier, upon selection of the alternative travelling path 40-3', at the work station AP than in accordance with the original travelling path 40-3 thereof.

In contrast to classic conveying systems (e.g. roller lines or belt conveyors) the travelling paths 40 can be combined arbitrarily by the segments 46. It is true that with classic conveying systems possibly also a number of possible routes exist from a first point to a second point within a warehouse. However, the number of these possible routes is limited and infinitesimal compared to the huge, almost infinite, number of courses of lines, or travelling paths 40, which can be construed and which can be combined from the "construction kit" of the segments 46. This diversity of possible travelling paths 40 represents one aspect which makes the final order generation possible in the FTF plane 24, in particular if a lot of FTF 28 are operated simultaneously. This will be explained in more detail below with reference to FIG. 7B.

Figure 7B:
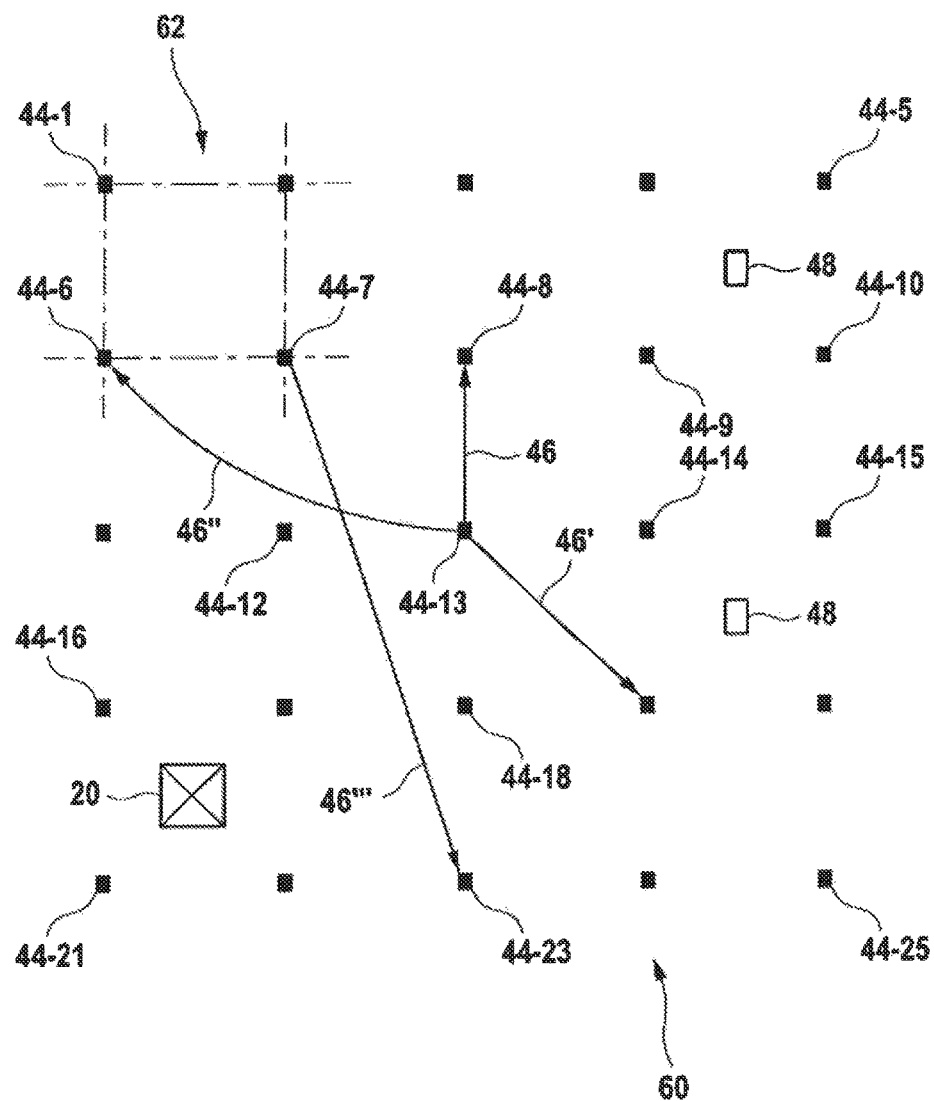

FIG. 7B shows an exemplary topology 60 comprising a grid 62 of grid points or way points 44. The topology 60 further includes obstacles such as a vertical conveyor 20 and a rack post 48. It is clear that the topology 60 comprises the positions of these elements. The topology 60 can further comprise the dimensions of the travelling area 26.

The way points 44 of FIG. 7B represent points of intersection of an (imaginary) grid which is indicated by means of dashed lines in the upper left corner. 25 grid points 44-1 to 44-25 are exemplarily shown which are arranged along a regular grid. It is clear that the grid does not need to be structured regularly. The way points 44 can also be distributed chaotically over the area 26.

The way points 44 are connected to each other by segments 46. The segments 46 are defined such that the FTF 28 do not collide with obstacles (e.g. the rack posts 48) during travelling along the segments 46. Via the segments 46 one way point 44, e.g., the way point 44-13, is not only connected to its direct next neighbor (44-8, 44-12, 44-14, and 44-18) but via diagonal segments 46' also to way points 44 (44-7, 44-9, 44-17, and 44-19) which are located farther away. The segments 46" are curved and connect the way point 44-13, for example, to the way points 44-6, 44-2, 44-4, 44-10, 44-16, 44-22, 44-24, or 44-20. Other segments 46 can be defined arbitrarily such as the segment 46''' along a straight line from the way point 44-7 to the way point 44-23. The possibility of defining segments 46, and thus to construct travelling paths 40, are unlimited, in particular because the course of the connection, i.e. of the segment 46, between two way points 46 can be defined arbitrarily.

Returning to FIG. 7A the order can be influenced, besides the selection of the course of the travelling path 40 from a starting vertical conveyor 20 to the target work station AP (i.e. beside the selection of the segments 46), by a starting time at which the corresponding FTF 28 begins to travel or by a velocity at which the corresponding FTF 28 moves.

Additionally, the FTF 28 can travel through sequencing harps 50 (cf. FIG. 5) which, however, are not shown in FIG. 7A.

Buffering devices (not shown in FIG. 7A) can be provided additionally in the FTF plane 24, which buffering devices will be described in more detail with reference to FIG. 10.

In addition, it is clear that in the example of FIG. 7A more or less than three FTF 28-1 to 28-3 can be used for completing the picking order which includes the articles #1 to #16. The course of the travelling paths 40 of the FTF 28 can be selected freely due to the absence of barriers, if the vertical conveyors 20 and the rack posts 48 are not considered.

As another sequencing alternative the FTF 28 can perform overtaking maneuvers by letting the FTF 28 travel, for example, a loop instead of straight ahead. While the one FTF 28 travels a loop another one of the FTF 28 can overtake on the straight track. Of course, it is also possible to invert this process so that the FTF 28 overtakes on the loop while the other FTF 28 travels straight ahead. In this case it makes sense to adapt the travelling velocities additionally.

Hereinafter a communication, which is not illustrated in more detail in the figures, between the material-flow computer MFR and the fleet manager FM will be described in the context of a loading process at a loading station 130.

An arbitrary piece good 116, such as the one with #1001, is ready for loading. The piece good #1001 stands, for example, directly in front of the separating conveyor 102. Before handing-over process to one FTF 28 can be initiated a new FTF 28 needs to be requested in order to stop at a corresponding loading-way point 44, or to pass the same in a synchronized manner. For this purpose the material-flow computer MFR transmits a travelling order to the fleet manager FM containing the information that the piece good #1001 is ready for retrieval, for example, at the way point

13. The fleet manager FM receives this travelling order and checks whether a corresponding order ID already exists in the system. If not, a new FTF 28 having the designation, for example, W42 is selected for travelling to the way point #13. The travelling order is stored, the travelling-order ID and an appropriate route are transmitted to the selected FTF 28.

The selected FTF 28 travels to the desired way point no. 13 and transmits a corresponding signal to the fleet manager FM. The fleet manager FM finds the order for this order ID and can now complete the order.

The material-flow computer MFR then starts the transfer of the piece good no. #1001. This means that the loading of the FTF 28, which is designated by W42, can be initiated. For this purpose a signal is output to a further controlling device which is responsible for the conveying system in order the piece good #1001 from the conveying system onto the separating conveyor 102 and from the separating conveyor 102 onto the FTF 28. Subsequently, the FTF 28 is driven to a desired target location for receiving the piece good #1001.

In a similar manner an unloading process is performed.

With reference to the FIG. 8 as well as 2A and 2B hereinafter systems 100 for loading and unloading piece goods 116 on and from an FTF 28 are described.

Figure 8A:
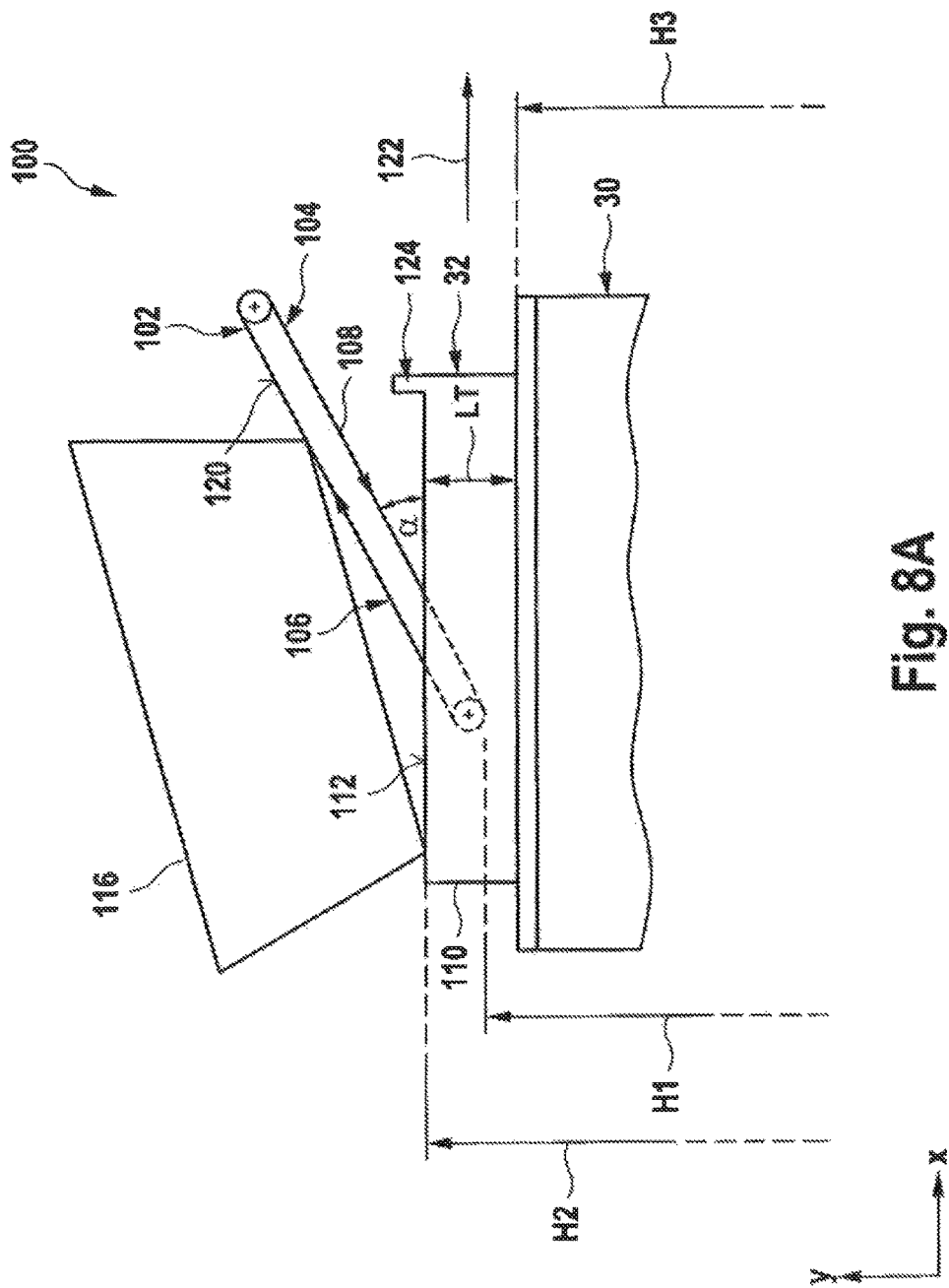
FIG. 8 shows a side view of a first system (FIG. 8A) for loading and unloading piece goods, and a side view of a second system (FIG. 8B) for loading and unloading piece goods.

As shown in FIG. 8A a first system 100 comprises at least one receiving device or taking-up 32, as already shown in FIG. 2, and a separating conveyor 102 which will be described in more detail below.

The separating conveyor 102 comprises a plurality of driven individual conveyors 104 which are arranged transversally (i.e. in the direction Z) next to each other and which are distanced transversally to each other. The individual conveyors 104 substantially extend straight and in parallel to the longitudinal direction X. The individual conveyors 104 can be formed, for example, by strap conveyors 106 respectively having an endless-circulating run, or strand, 108, or as a small-roller conveyor (not shown here). The individual conveyors 104 are driven, wherein corresponding drive and machine frame of the individual conveyors 104 are not shown here.

The separating conveyor 102 meshes with a plurality of supporting lamellas 110, which are also designated briefly hereinafter as lamellas 110. As shown in FIG. 2 all of the lamellas 110 are preferably formed identically and extend straight along the longitudinal direction X. The lamellas 110 in common form the receiving device 32. In FIG. 2 the receiving device 32 includes, for example, eight lamellas 110-1 to 110-8 which have an L-shaped in a side view. The lamellas 110-1 to 110-8 extend in parallel to the longitudinal direction X and are equally distanced to each other in the transversal direction Z for defining gaps 118 therebetween. In FIG. 2 seven gaps 118-1 to 118-7 are shown. It is clear that the separating conveyors 102 (FIG. 8) in this case preferably comprise seven individual conveyors 104 which are arranged such that they mesh with the gaps 118-1 to 118-7 in a contactless manner if the FTF 28 travels along the longitudinal direction X (cf. travelling direction 122) through the separating conveyor 102 as exemplarily shown in FIG. 8.

The lamellas 110, or top sides thereof, define a substantially flat transport surface 112 if one drops finger-like optional projections 124 which can be provided at a downstream end of the lamellas 110 in terms of stoppers for the piece goods 116. The transport surface 112 is depicted in FIG. 2B and enclosed by an auxiliary line 114. In a loaded state of the FTF 28 the piece good 116 sits flat on the top side of the lamellas 110. In this case a leading edge of the piece good 116 preferably abuts against the projections 124 which protrude perpendicularly from the transport surface 112. The shown projections are static because they are formed integrally with the lamellas 110. Alternatively, active projections 124 can be provided, which can be extracted and retracted. The projections can also be provided additionally at the downstream end the lamellas 110. In addition, the lamellas 110, which are provided laterally in Z at the outside, can be formed slightly elevated relative to the central lamellas for forming a lateral edge in the transport surface 112 which edge prevents loaded piece goods 116 laterally slipping off during travel of the FTF 28. The transport surface 112 in this case forms a "nest" in which the piece goods 116 can sit safely in particular during travel of the FTF 28.

The gaps 118 preferably comprise a constant depth LT (cf. FIG. 8) over a length thereof in the longitudinal direction X for avoiding collisions between the individual conveyors 104 in the dived-in state and the FTF 28. A lower end of the separating conveyor 102 is arranged at a height H1 located between a height H2 of the transport surface 112 and a height H3 determined by a top side of the base vehicle 30. The depth LT of the gaps 118 corresponds also to a difference of the heights H2 and H3. Dive-in depth of the separating conveyor 102 into the receiving device 32 corresponds to a difference of the heights H2 and H1.

Figure 8B:
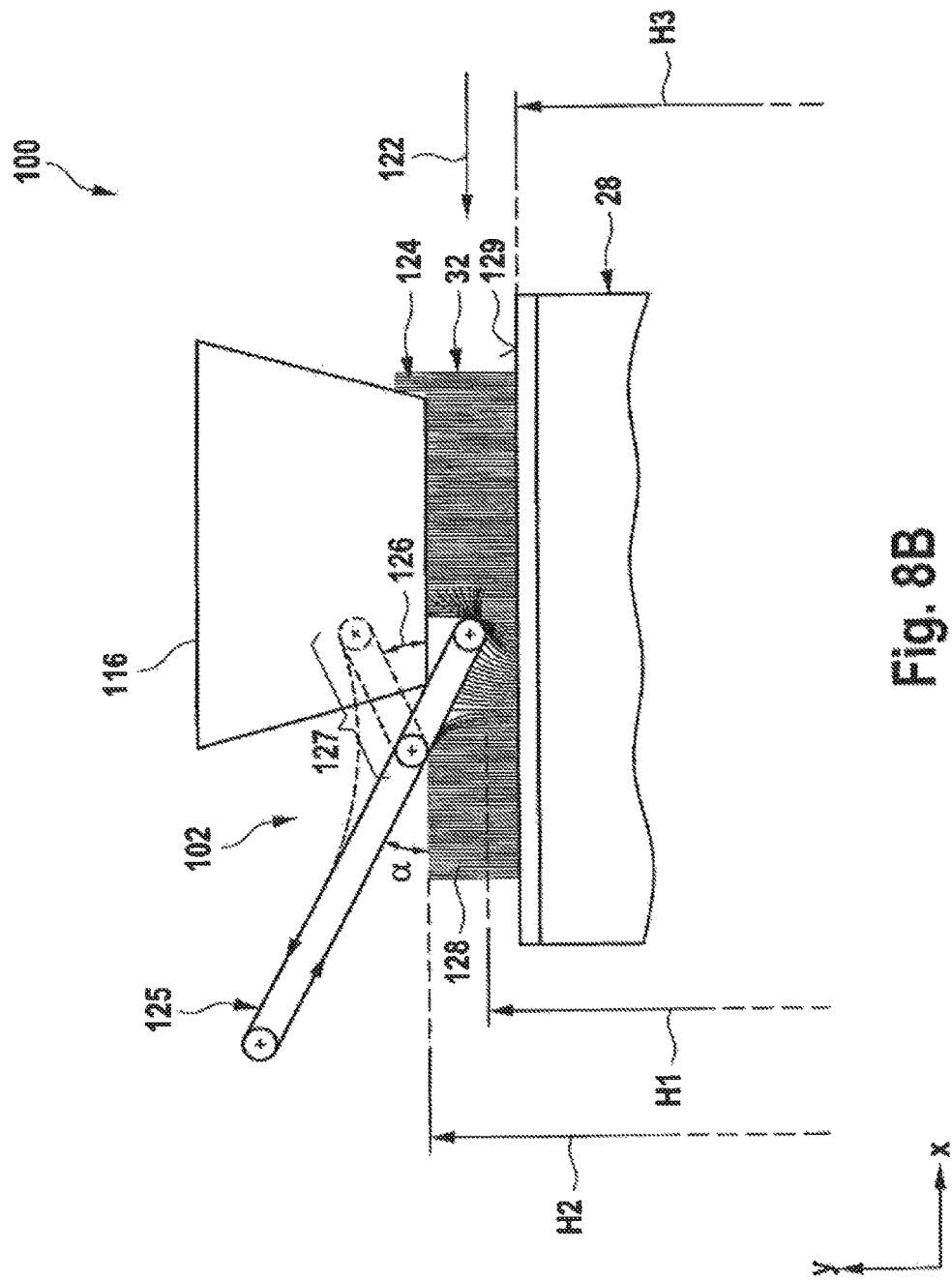

FIGS. 8A and 8B respectively show an unloading process where the piece good 116 is lifted from the receiving device 32 by means of the separating conveyor 102. For this purpose the separating conveyor 102 is operated at a conveying velocity which substantially corresponds to a travelling velocity of the FTF 28 which FTF 28 travels, preferably continuously, through the separating conveyor 102. During unloading the conveying velocity can be set slightly higher than the travelling velocity so that the piece good 116 is drawn onto the separating conveyor 102. During loading the travelling velocity can be slightly higher for drawing the piece good 116 onto the FTF 28. Due the slightly higher velocity (e.g., 5% higher) the transfer process will be assisted in a pushing or pulling manner. Returning to the unloading process the run 108 of the individual conveyors 104 is moved clockwise in FIG. 8A, if the FTF 28 travels through the separating conveyor 102 from the left to the right in FIG. 8A. The conveying surface 120 encloses together with the transport surface 112 an acute angle α which is selected so that the separating conveyor 102 does not represent an obstacle for the piece good 116 during unloading, which obstacle would push the piece good 116 to the left from the receiving device 32. The separating conveyor 102 represents a ramp.

It is clear that the separating conveyor 102 can also be orientated horizontally, wherein the FTF 28 then travels on a surface which is declined in the region of the separating conveyor 102 by an angle α relative to the horizon. The separating conveyor 102 can be slightly inclined downwards relative to the horizon. This is of particular advantage if the separating conveyor 102 is formed as a small-roller conveyor (without drive) because then the FTF 28 can deliver the piece goods 116 by merely driving through, wherein the delivered piece goods 116 are transported at least a little further after the delivery due to gravity only.

In FIG. 8A the FTF 28 travels from the left to the right during unloading. During loading the FTF travels from the right to the left, wherein the projection(s) 124 then in turn are arranged at a downstream end of the FTF, i.e. at the right-hand side in FIG. 8A. The separating conveyor 102 is operated during loading in an inverted direction, i.e. counterclockwise. Again, the conveying velocity of the separating conveyor 102 substantially is as high as the travelling velocity of the FTF 28. The fleet manager FM (cf. FIG. 1), which is not shown in FIG. 8A, synchronizes the separating conveyor 102 for this purpose with the FTF 28, which travels through the separating conveyor 102, so that the separating conveyor 102 is operated at the time of handing-over the piece good 116 onto the receiving device 32. The fleet manager FM receives from the FTF 28 a signal as soon as the FTF 28 detects the way point 44 which is assigned to the system 100. Of course, the individual conveyors can also be operated continuously, at least during unloading, so that synchronization is omitted. The synchronization can also be omitted during loading if the FTF 28 stops at the handing-over point, i.e. does not pass continuously below the separating conveyor 102.

FIG. 8B shows a second system 100 for unloading a piece good 116 from an FTF 28. The system 100 of FIG. 8B distinguishes from the system of FIG. 8A substantially in the embodiment of the separating conveyor 102 and in the embodiment of the receiving device 32. The separating conveyor 102 is formed as one single belt conveyor 125 which is about as wide in Z as the receiving device 32. The belt conveyor 125 is formed pivotally at a lower end region 126 thereof, as indicated by an arrow 126. A lower portion 127 of the belt conveyor 125 is pivotable upwardly for being in line with safety requirements so that humans cannot get hurt. The run of the belt conveyor 125 is moved in FIG. 8B during unloading of the piece good 116 in a counterclockwise manner.

The receiving device 32 of FIG. 8B preferably is dimensioned identically to the receiving device 32 of FIG. 8A. However, the receiving device 32 of FIG. 8B comprises flexible brushes 128 instead of the supporting lamellas 110. The brushes 128 are so hard that they can hold the piece good 116 at a minimum distance relative to the top side 129 of the FTF 28. The brushes 128 can be deformed elastically so that they can dive below the separating conveyor 102. The brushes 128 are arranged preferably as dense as a carpet, but alternatively can be arranged on FTF 28 like the supporting lamellas in FIG. 8A.

Figure 9:
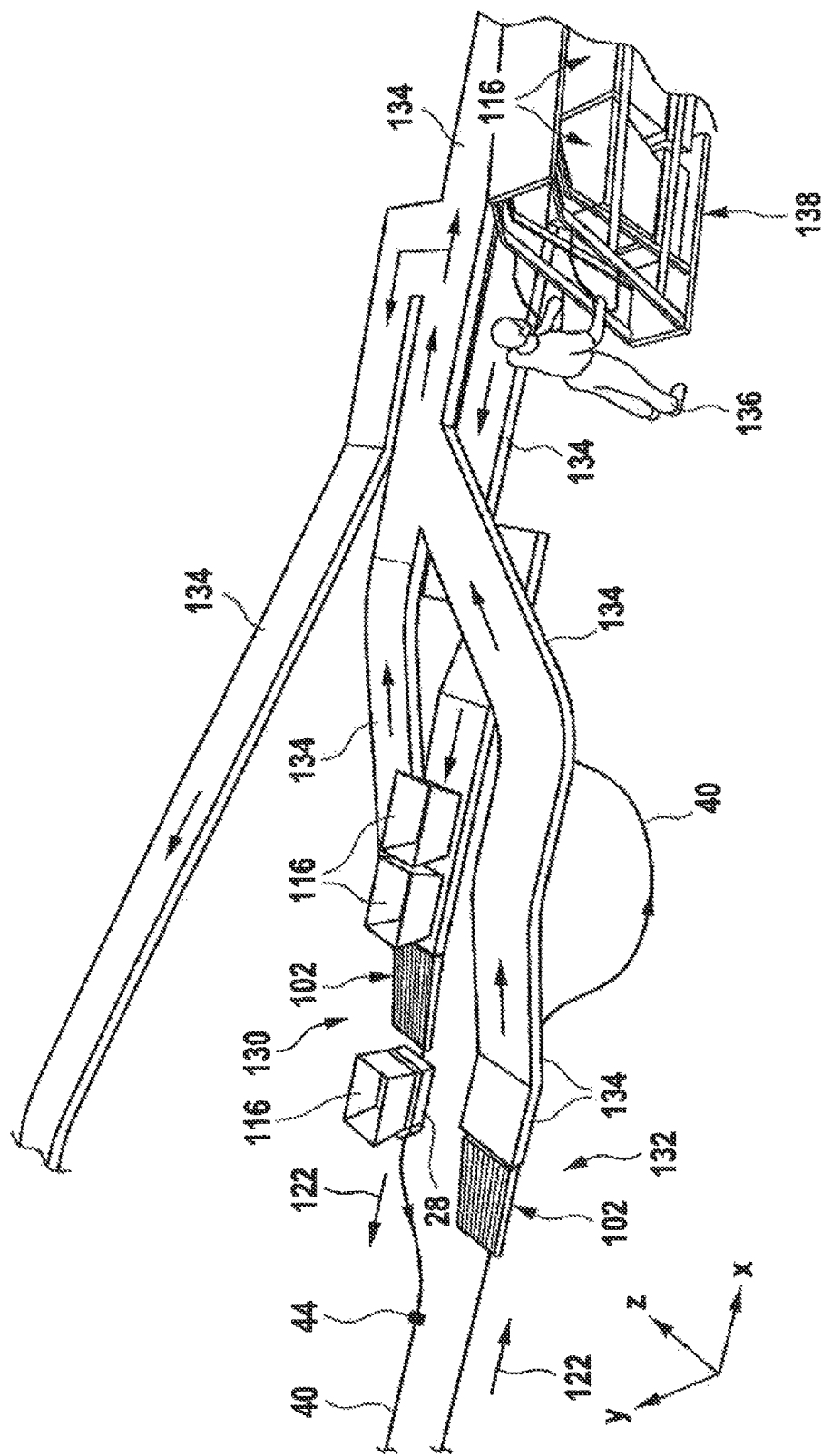
FIG. 9 shows a perspective view of a loading station and an unloading station establishing a material-flow connection between an FTS and steady conveyors.

FIG. 9 shows the system 100 for loading and unloading of piece goods 116 in an exemplary application. FIG. 9 shows perspectively the connection of an FTS via a loading station 130 and via an unloading station 132 to a conventional conveying system, in particular to a classic steady conveyor 134 such as a roller track or a belt conveyor. The travelling path 40 extends in parallel beneath the separating conveyor 102. At the unloading station 132 the corresponding separating conveyor 102 meshes out the piece goods and conveys the same onto the adjacent steady conveyor 134. At the loading station 130 the corresponding separating conveyor 102 guides the piece goods 116 via its meshing individual conveyors 104 onto the receiving device 32 of a passing FTF 28. The loading station 130 is supplied via a further conveying system 134 with the piece goods 116 as indicated by means of arrows. The conveying system 134 towards the loading station 130 is arranged deeper than the conveying system 134 which leads away from the unloading station 132.

Also FIG. 9 shows a connection of the FTF 28, as it is exemplarily used in the FTF plane 24 (FIGS. 4 and 5), to a conventional conveying system 134. Further, a picker 136 is shown in FIG. 9 who pushes a manual picking vehicle 138. Thus, the invention can be integrated at any time into existing storage and order-picking systems and can be connected to conventional conveying systems.

Figure 10:
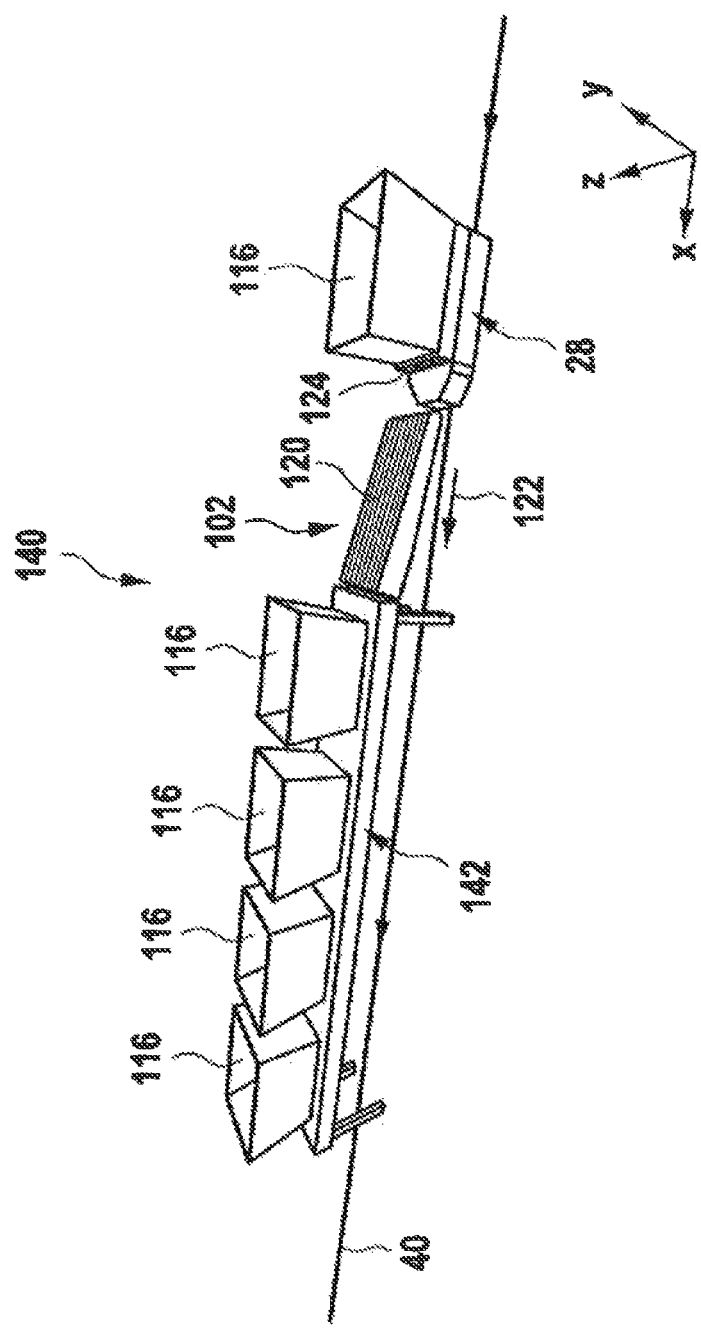
FIG. 10 shows a perspective view of a buffer station.

FIG. 10 shows a perspective view of a further application of the system 100 for loading and unloading piece goods 116 at a buffer station 140 which can be used, for example, in the FTF plane 24.

Adjacent to the separating conveyor 102 of FIG. 10 a buffer-conveying system 142 (FILO principle) is arranged, which is here driven bidirectionally and includes four buffering locations for four piece goods 116. In case of a unidirectionally driven conveying system 142 an additional separating conveyor 102 (not shown in FIG. 10) could be provided at the other end for loading the FTF 28 (FIFO principle). In FIG. 10 the FTF 28 follows the travelling path 40 which is orientated in parallel to the individual conveyors 104 of the separating conveyor 102. The FTF 28 travels in FIG. 10 from the right to the left for delivering piece goods 116.

As soon as a delivered piece good 116 is positioned on the separating conveyor 102 it can be conveyed further towards the buffer-conveying system 142. The buffer-conveying system 142 can be formed by segments for individually moving the piece goods 116 from a buffering location to another buffering location.

As soon as the buffer station 140, which in the present case can receive a maximum of five piece goods 116, is full it can deliver the buffered piece goods 116 again to empty FTF 28. For this purpose both the buffer-conveying system 142 and the separating conveyor 102 are operated in an inverted direction. The (empty) FTF 28, which are not shown in FIG. 10, then travel from the left to the right in a meshing manner through the separating conveyor 102 along the travelling path 40.

The application of the buffer station 140 in the FTF plane 24 always makes sense if, for example, more piece goods 116 in the FTF plane 24 need to be sequenced than FTF 28 are present. In this case the FTF 28 can retrieve the to-be-sequenced piece goods 116 from the vertical conveyors 20 and deliver same temporarily to one (or more) buffer stations 140 for retrieving same from there on demand.

Figure 11:
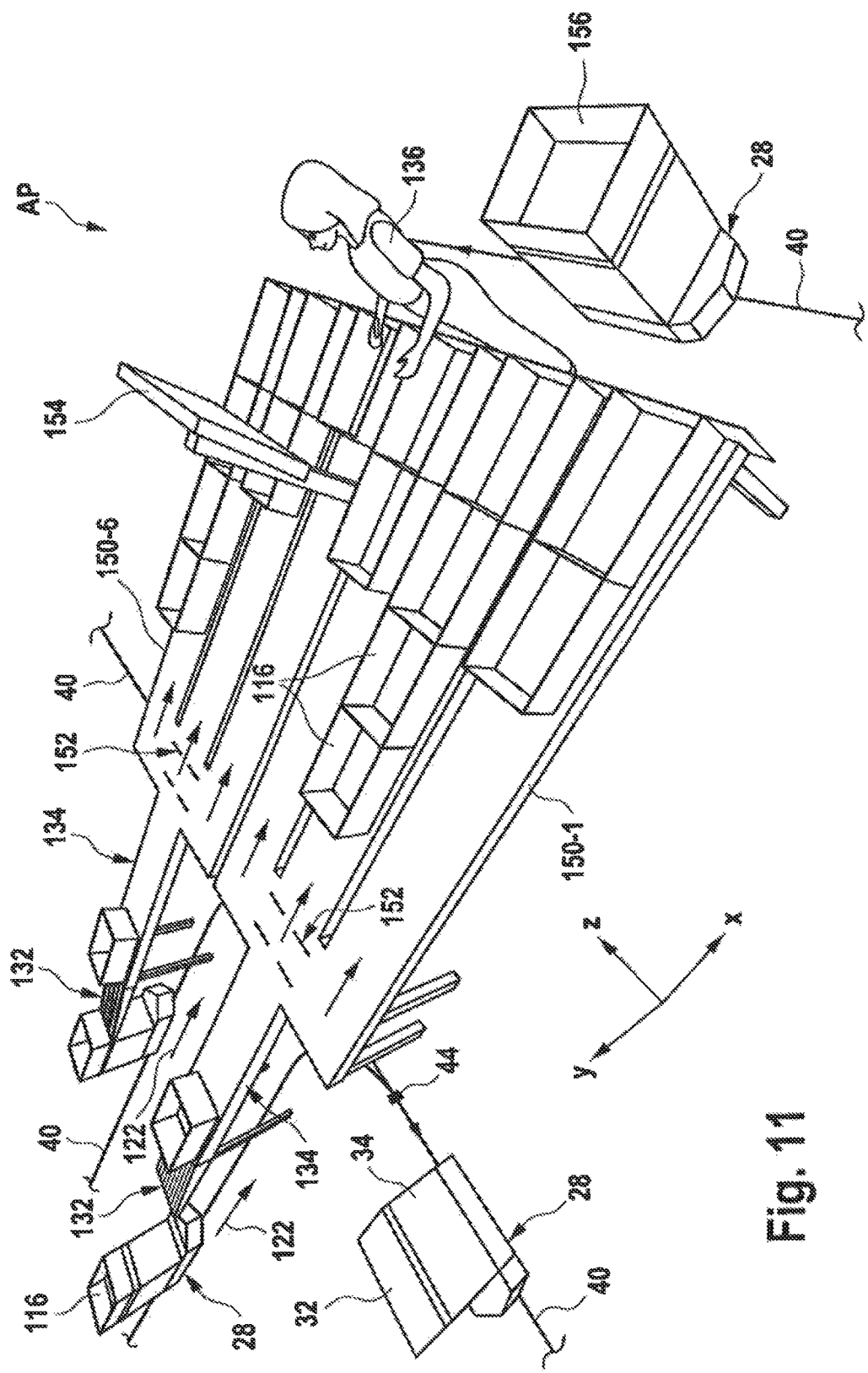
FIG. 11 shows a perspective view of a work station.

FIG. 11 shows a perspective view of a further embodiment of a work station AP as it can be used, for example, in the FTF plane 24 of FIG. 4.

The work station AP of FIG. 11 comprises two unloading stations 132 for distributing the piece goods 116 (e.g., storage containers) towards a picker 136 via driven buffering lines 150. In FIG. 11 six buffering lines 150-1 to 150-6 are exemplarily shown, which are arranged in parallel to each other and along the longitudinal direction X. The second and fifth buffering line 150-2 and 150-5 are respectively provided further with a transferring device 152 for distributing the piece goods 116 transversally into the remaining buffering lines 150-1, 150-3, 150-4, and 150-6. The transferring devices 152 can be realized, for example, by strap conveyors which can be lifted and lowered.

The work station AP of FIG. 11 can further comprise a display 154. The picker 136 gets indicated via the display 154 how many articles he must deliver into the target container 156 (e.g. order container) from which of the containers. The target container 156 can also be moved by means of one the FTF 28 along a travelling path 40 from and to the picker 136. The FTF 28 can be used for both storing and retrieving the articles and for picking, or transporting, storage and order containers.

Figure 12:
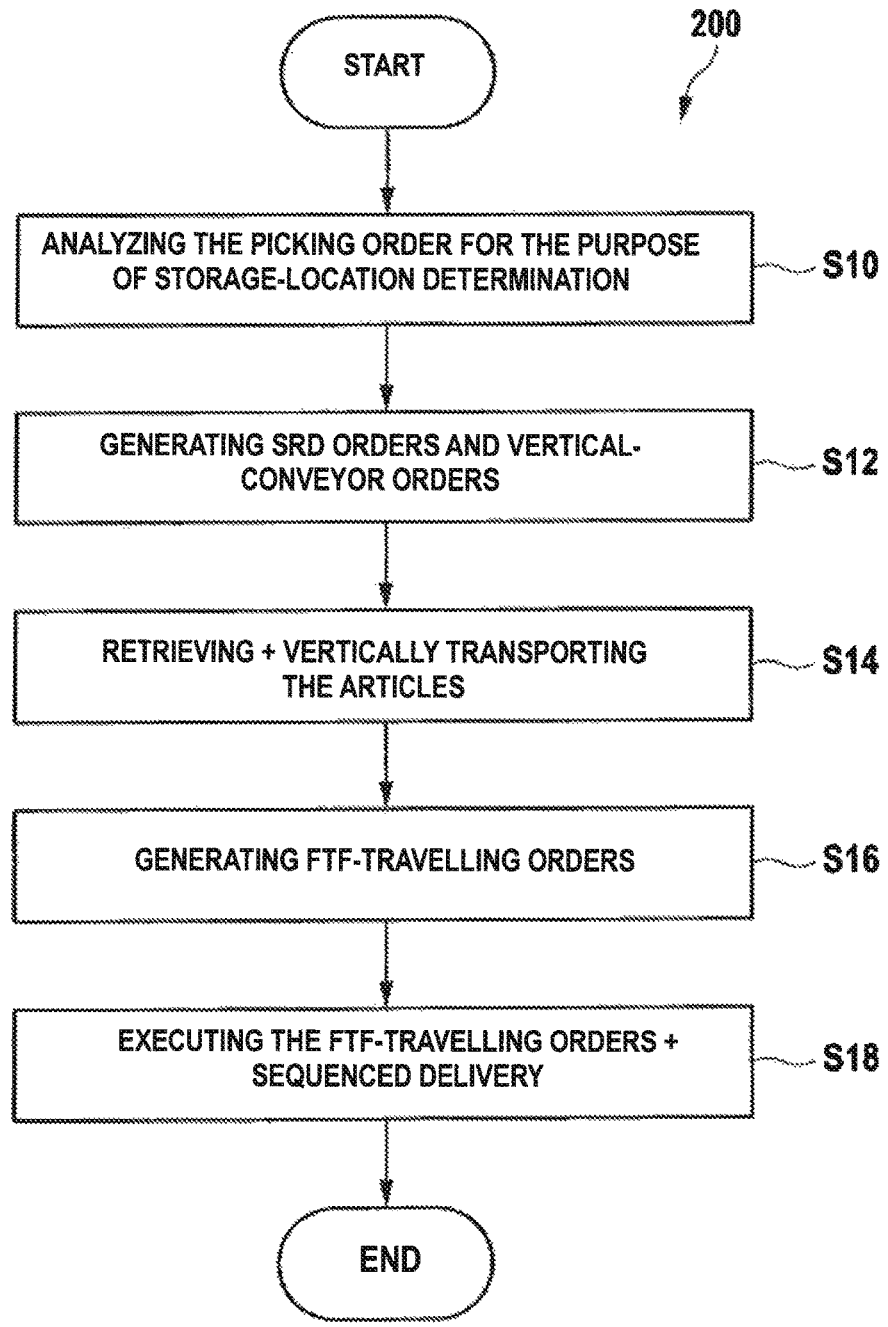
FIG. 12 shows a flow chart.

FIG. 12 shows a flow chart which explains generally the above-described method for chaotically retrieving and sequenced providing the articles at the work station AP.

In a first step S10 the picking orders, or the picking order, are/is analyzed for determining the rack locations R in which the required articles are stored. In step S12 SRD orders and vertical-conveyor orders are generated and transmitted to the SRD 22 and the vertical conveyors 20. In step S14 the required articles are retrieved by the SRD 22 and are transported vertically by the vertical conveyors 20 into the FTF plane 24. In step S16 FTF-specific travelling orders, or FTF-travelling orders, are generated and transmitted to the affected, or selected, FTF 28. In step S18 the FTF-travelling orders are executed by the FTF 28 for delivering the articles in the desired absolute order to the work stations AP.

Up to now, substantially retrieval including final sequenced handing-over at a target location such as a work station AP has been described for the purpose of picking. In this context the material flow 12 is performed from the rack arrangement 12 via the vertical conveyors 20, which represent in relation to the FTF-travelling orders, or FTF-travelling paths, starting locations in the FTF plane 24, towards the work stations AP which represent in relation to the FTF-travelling orders, or FTF-travelling paths 40, the target locations.

It is clear that the invention can also have advantages during storing. The material flow 12 is directed during storing in an inverted manner, i.e. the vertical conveyors 20, which are then storing, are then target locations for the FTF 28 coming from the WE (cf. FIG. 1), and separation stations (not shown in FIG. 1) where, for example, goods-receipt pallets, which include articles of one type only, are separated individually onto the FTF 28 are then starting locations for the FTF 28 in the FTF plane 24. The FTF plane 24 then represents, with regard to material-flow planning, a stage in the process of distributing the articles. With the article distribution the WE articles are distributed in terms of material flow across the rack arrangement 14 (SKU spread) so that later, during retrieval, each article of an arbitrary picking order is retrievable from the rack locations R from preferably one single rack aisle 18. Also, a warehouse-filling grade, which should be identical in the ideal case in each region of the rack arrangement 14, can be considered during the planning of the goods-storing process.

In this case the FTF plane 24 plays a decisive role because, in contrast to the classic pre-zone having steady conveyors, each of the rack locations R can be reached via shortest path. The FTF 28 can move freely beneath, above, or within the rack arrangement 14 along goods-receipt article-specific freely selectable, preferably path-optimized, travelling paths 40. The FTF 28 travel to such vertical conveyors 20 which are located as close as possible to a desired storing-in rack location R. With multiple-deep handling even the sequence plays a role again so that the FTF plane 24 operates in a sequenced manner even during storing.

LIST OF REFERENCE NUMERALS

10 Storage and order-picking system
WE Goods receipt
WA Goods issue
12 Material flow
14 Rack arrangement
16 Rack
18 (Rack) aisle
20 vertical conveyor
T Transfer location
R Rack locations
22 Storage and retrieval device/SRD
AP Work station
24 FTF plane
26 Travelling/action area
28 Driverless transport vehicle (FTF)/shuttle
MFR Material-flow computer
LVR Warehouse-management computer
FM Fleet manager
30 (Basic) vehicle
32 Article receiving device
34 Top
36 (Proprietary) communication protocol
40 Travelling path
42 Elevator arrangement
44 Way point
46 Segment
48 Rack post
50 Sequencing harp
52 Elevator group
60 Topology
62 Grid
100 System for loading/unloading
102 Separating conveyor
104 Individual conveyor
106 Strap conveyor
108 Run or strand
110 (Supporting) lamella
112 Transport surface
114 Auxiliary line
116 Piece good
118 Gap
LT Minimum depth of 118=H2–H3/depth of gap
H1-H3 Heights
Dive-in depth=H2–H1
α Angle between 102 and 112
120 Conveying surface of 102
128 Travelling direction of 28
124 Finger-like projection/stopper
125 Belt conveyor
126 Arrow
127 Lower portion of 125
128 Brushes
129 Top side of 28
130 Loading station
132 Unloading station
134 Steady conveyor
136 Picker
138 Manual picking vehicle
140 Buffer station
142 Buffer-conveying system
150 Buffering lines
152 Transferring device
154 Display
156 Target container

I claim:
1. A storage and order-picking system comprising:
a statically arranged rack arrangement, which comprises a plurality of racks and a plurality of statically arranged vertical conveyors, wherein the racks respectively include a plurality of rack locations, which are arranged on top of each other and next to each other and in and from which rack locations storage goods are storable and retrievable, and transfer locations, which are arranged as buffer locations oppositely to the vertical conveyors in the racks, wherein the racks define at least one rack aisle between each other, wherein respectively several ones of the vertical conveyors are arranged either laterally adjacent to longitudinal sides of the racks or within the racks for linking the rack aisles in terms of material flow, and wherein the vertical conveyors are configured to transport the storage goods substantially vertically;

a plurality of storage and retrieval devices which travel in the rack aisles, wherein the storage and retrieval devices chaotically retrieve the storage goods and transport the storage goods substantially horizontally along the rack aisles between the rack locations and the transfer locations;

at least one fleet of autonomously moveable driverless transport vehicles, FTF;

an FTF plane which is substantially free of barriers and which extends beneath, above, or through the rack arrangement, wherein the FTF plane is coupled, in a conveying manner, via the vertical conveyors, which reach verti-cally right to the FTF plane, to the rack arrangement, wherein the FTF plane comprises a travelling area including a topology of way points and segments along which the FTF move in a guided manner, wherein each of the segments extends from one of the way points to another adjacent one of the way points;

at least one target location, which is connected, in terms of material flow, to the vertical conveyors via the FTF;

a fleet manager having access to the topology and being configured for generating and outputting FTF-dedicated individual travelling orders, which re-spectively include navigation information and an FTF-specific individual travel-ling path, for transporting the storage goods, which are not yet transported by the vertical conveyors in an absolute order into the FTF plane, along the FTF-specifically generated individual travelling paths from the vertical conveyors to the at least one target location and for handing-over the storage goods in the absolute order to the at least one target location, or vice versa.

2. The system of claim 1, wherein the FTF plane extends at least across an area which encloses the vertical conveyors.

3. The system of claim 2, wherein the FTF plane extends at least across an area which further encloses the racks and the rack aisles of the rack arrangement substantially completely.

4. The system of claim 1, wherein each of the individual travelling orders defines for the corresponding FTF one of several possible travelling paths between one of the vertical conveyors and the at least one target location, and comprises sequencing and overtaking information so that such of the FTF, which transport the storage goods between the vertical conveyors and the at least one target location, overtake each other and hand-over the storage goods in the absolute order.

5. The system of claim 1, wherein each of the vertical conveyors is arranged adjacent to several ones of the transfer locations which are respectively formed in a rack-integrated manner.

6. The system of claim 1, wherein further a material-flow computer is pro-vided, which is configured for generating path-optimized transport orders dedicated to the storage and retrieval devices.

7. The system of claim 1, wherein each of the FTF is formed without a load-handling device and includes a passive receiving device.

8. The system of claim 1, wherein the travelling area further comprises at least one sequencing harp.

9. The system of claim 1, wherein the storage and retrieval devices retrieve the articles in a path-optimized manner.

10. The system of claim 9, wherein the vertical conveyors transport the re-trieved articles in a path-optimized manner into the FTF plane.

11. The system of claim 1 which comprises a plurality of the target locations, wherein each of the target locations is coupable, in terms of material flow, to each of the vertical conveyors by means of the FTF via several different travelling paths which are arrangable freely.

12. The system of claim 1, wherein the topology further comprises location information of the vertical conveyors and of other travelling obstacles in the travelling area.

13. A method of supplying, in a sequenced manner, a target location with a plurality of articles, which represent a picking order and which are retrieved chaotically from racks of a statically arranged rack arrangement by means of storage and retrieval devices, SRD, which travel in the rack aisles between op-positely arranged racks, and which articles are transported vertically by means of a plurality of statically arranged vertical conveyors into an FTF plane, which includes a plurality of autonomously moveable driverless conveying vehicles, FTF, and a travelling area, in order to be provided by means of the FTF on the travelling area, which comprises a topology of way points and segments along which the FTF travel in a guided manner, in an absolute order at the target loca-tion, wherein each of the segments extends from one of the way points to an-other adjacent one of the way points, and wherein related ones of the segments define a travelling path, the method including the following steps:

determining a quantity of rack locations of the racks where the articles are stored which are to be retrieved in accordance with the picking order;

generating SRD-transport orders and transmitting the SRD-transport or-ders to the corresponding storage and retrieval devices;

retrieving and delivering the articles by means of the storage and retrieval devices in accordance with the SRD-transport orders;

generating vertical-conveyor transport orders and trans-mitting the gener-ated vertical-conveyor transport orders to the corresponding vertical conveyors;

vertically transporting the articles into the FTF plane by means of the ver-tical conveyors;

generating FTF-dedicated individual travelling orders, which respectively include navigation information and an FTF-specific individual travelling path, and trans-mitting the travelling orders to the corresponding FTF so that the stor-age goods, which are not yet transported by the vertical conveyors in an abso-lute order into the FTF plane, are transported along the FTF-specifically gener-ated individual travelling paths from the vertical conveyors to the target location and are handed over in the absolute order to the target location; and executing the travelling orders by the corresponding FTF, wherein the corresponding FTF move along the FTF-specifically generated individual travel-ling paths from the corresponding vertical conveyors to the target loca-tion and hand over the articles in the absolute order to the target location.

14. The method of claim 13, wherein the retrieval of the articles by means of the storage and retrieval devices is performed in a path-optimized manner.

15. The method of claim 14, wherein the FTF plane extends at least across an area which encloses the vertical conveyors and which further encloses the racks and the rack aisles of the rack arrangement substantially completely.

\* \* \* \* \*